United States Patent
Mitani et al.

(10) Patent No.: US 6,483,783 B1
(45) Date of Patent: Nov. 19, 2002

(54) MAGNETO-OPTICAL DISK APPARATUS CAPABLE OF ACCURATELY ENLARGING AND REPRODUCING A MAGNETIC DOMAIN AND METHOD OF REPRODUCING THE SAME

(75) Inventors: Kenichiro Mitani, Gifu (JP); Naoyuki Takagi, Gifu (JP); Hitoshi Noguchi, Gifu (JP); Hiroki Ishida, Gifu (JP); Atsushi Yamaguchi, Gifu (JP); Morio Nakatani, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 180 days.

(21) Appl. No.: 09/713,034

(22) Filed: Nov. 16, 2000

(30) Foreign Application Priority Data

Nov. 19, 1999 (JP) .............................. 11-329022

(51) Int. Cl.$^7$ .............................. G11B 11/00
(52) U.S. Cl. .................. 369/13.15; 369/13.28
(58) Field of Search ........................ 369/13.15, 13.14, 369/13.17, 13.18, 13.22, 13.23, 13.09, 13.08, 13.05, 13.28

(56) References Cited

U.S. PATENT DOCUMENTS

| | | | | |
|---|---|---|---|---|
| 5,270,987 A | * | 12/1993 | Kaku et al. .................. 369/13 |
| 5,444,678 A | * | 8/1995 | Ogata ........................... 369/13 |
| 5,485,435 A | * | 1/1996 | Matsuda et al. ............... 369/13 |
| 5,825,723 A | * | 10/1998 | Hirokane et al. ............. 369/13 |
| 6,018,505 A | * | 1/2000 | Miyatake et al. ............. 369/13 |
| 6,150,038 A | * | 11/2000 | Hirokane et al. ............. 369/13 |
| 6,346,322 B1 | * | 2/2002 | Iwata et al. .................. 428/332 |

* cited by examiner

Primary Examiner—Tan Dinh
(74) Attorney, Agent, or Firm—Armstrong, Westerman & Hattori, LLP

(57) ABSTRACT

A magnetic head is configured of a core and a coil wound around the core and passing current through the coil in a variable direction allows the core to have an edge generating an alternating magnetic field Hex1 and another edge generating an alternating magnetic field Hex2. Alternating magnetic fields Hex1 and Hex2 are applied to the respective edges. Furthermore, a laser beam LB1 is directed such that its optical axis L01 matches the edge receiving the alternating magnetic field Hex1, and a laser beam LB2 is directed such that its optical axis L02 matches the edge receiving the alternating magnetic field Hex2. A first magneto-optical signal detected through the alternating magnetic field Hex1 and the laser beam LB1 and a second magneto-optical signal detected through the alternating magnetic field Hex2 and the laser beam LB2 are composited together. As such, an alternating magnetic field can be applied to a magneto-optical recording medium at a predetermined angle to an in-plane direction of the recording medium to accurately enlarge a magnetic domains for reproduction.

19 Claims, 27 Drawing Sheets

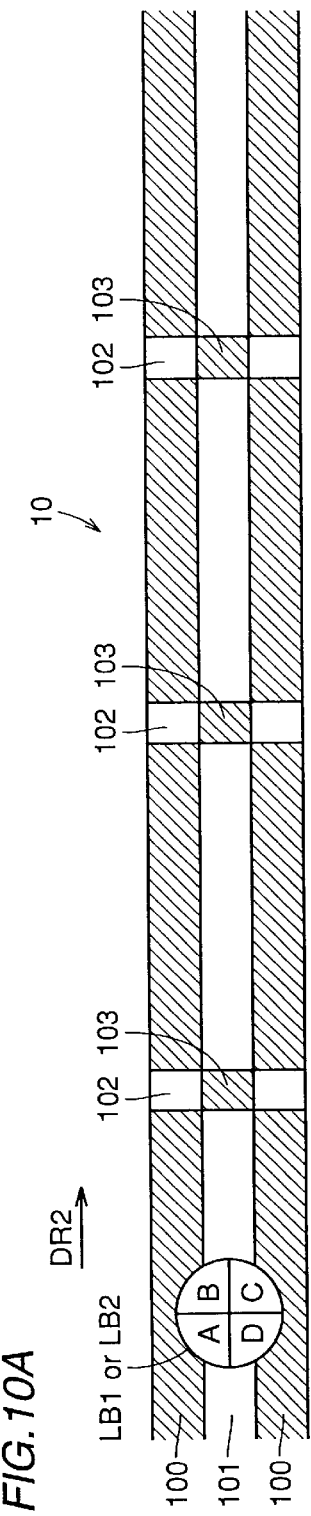
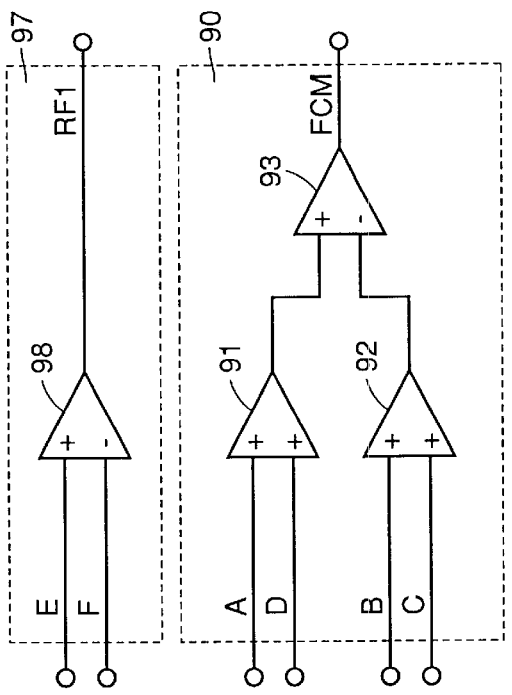
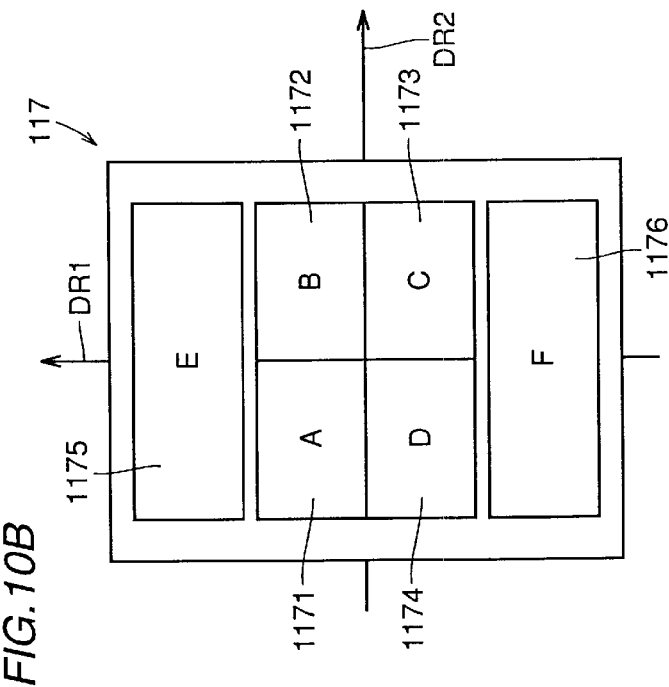
FIG.10A
FIG.10C
FIG.10B

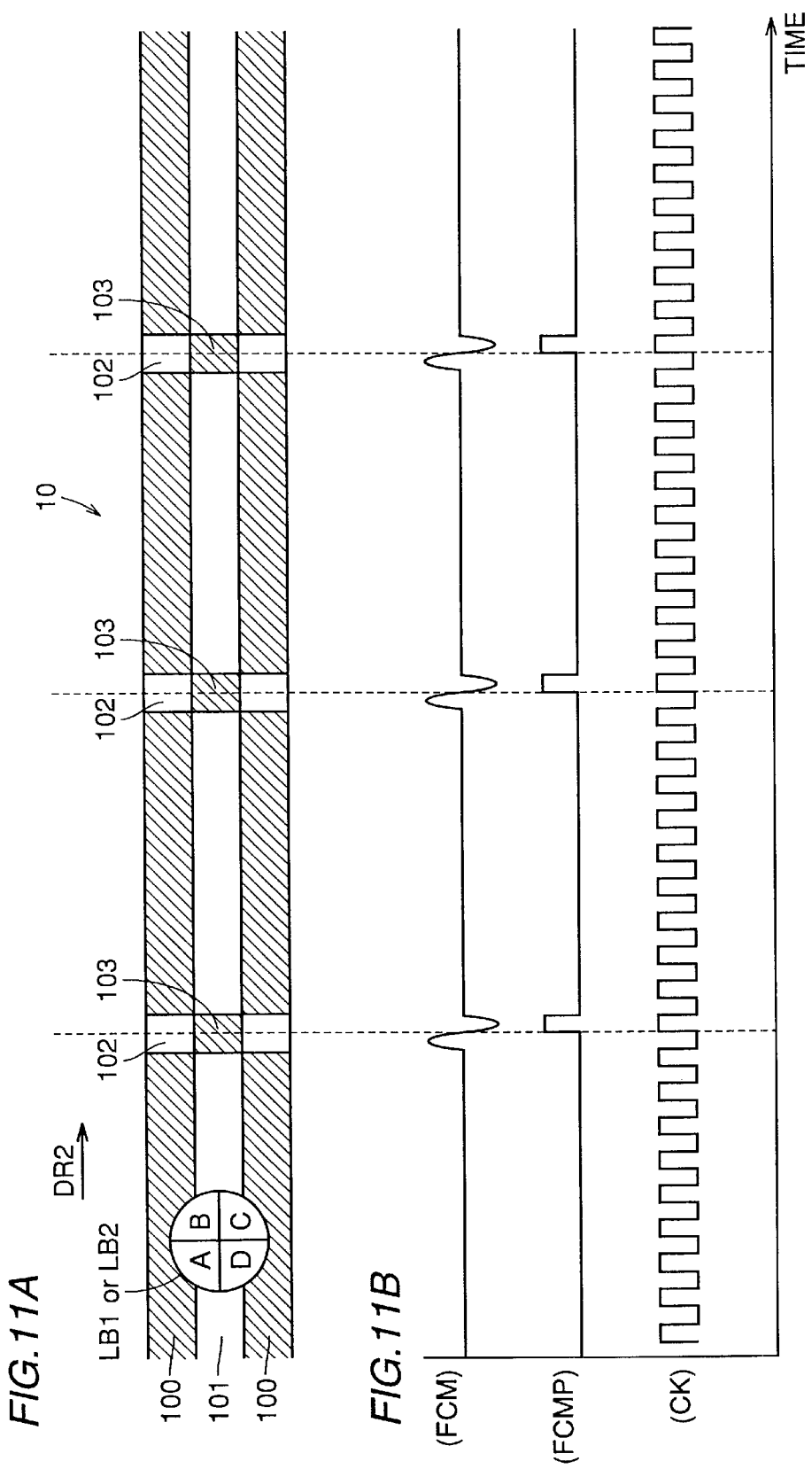

VERTICAL DIRECTION

IN-PLANE DIRECTION

IN-PLANE DIRECTION

MAGNETO-OPTICAL DISK APPARATUS CAPABLE OF ACCURATELY ENLARGING AND REPRODUCING A MAGNETIC DOMAIN AND METHOD OF REPRODUCING THE SAME

BACKGROUND OF THE INVENTION

1. Field of the Invention

The present invention relates to magneto-optical disk apparatuses employing a magnetic field and a laser beam to reproduce a signal from a magneto-optical recording medium having a magnetic domain formed therein to record a signal, and methods of reproducing the same.

2. Description of the Background Art

A magneto-optical recording medium has been noted as a recording medium which is rewritable, has a large storage capacity and is highly reliable, and it has been put to practical use as computer memory or the like. Furthermore, in recent years a magneto-optical recording medium having a storage capacity of 6.0 Gbytes is standardized as the Advanced Storaged Magneto Optical (AS-MO) disk standard and it is about to be put to practical use.

Furthermore, there has also been proposed a magneto-optical recording medium having a recording capacity of 14 Gbytes allowing a magnetic domain to be transferred from a recording layer to a reproducing layer and enlarged in the reproducing layer to reproduce a signal. In this magnetic domain enlargement and reproduction system, a signal is reproduced by applying to a magneto-optical recording medium an alternating magnetic field having a predetermined angle to an in-plane direction of the recording medium. More specifically, as shown in FIG. 26A, the magneto-optical recording medium includes a recording layer 5 having a magnetic domain of a different length and in the magnetic domain enlargement and reproduction system an alternating magnetic field is applied and a laser beam is directed to transfer each magnetic domain from recording layer 5 via a non-magnetic layer 4 to a reproducing layer 3 and enlarge it therein. The enlarged magnetic domain is detected by a laser beam. Herein, the alternating magnetic field is applied to recording layer 5 at substantially the center of each magnetic domain. If a magnetic domain in recording layer 5 varies in length a magnetic field leaking from the magnetic domain of recording layer 5 via non-magnetic layer 4 to reproducing layer 3 also has a different intensity profile. A leaking magnetic field for a magnetic domain having a unit domain length has an intensity increasing in the direction from an end of the magnetic domain to the center thereof. A leaking magnetic field for a magnetic domain having a length more than twice the unit domain length, has a high intensity at an end of the magnetic field and a low intensity at the center thereof. As such, if an alternating magnetic field is applied to each magnetic domain at the center thereof, magnetic domains having different lengths cannot be accurately transferred to and enlarged in reproducing layer 3.

To overcome this disadvantage, there has been proposed applying to a magnetic domain at an end thereof (i.e., a boundary between magnetic domains) an alternating magnetic field Hex1 having a predetermined angle to an in-plane direction of a magneto-optical recording medium, to enlarge and reproduce the magnetic domain. Recording layer 5 has magnetic domains each having a boundary with a leaking magnetic field 190–194 and when the boundaries with leaking magnetic fields 190, 192, 194 receive alternating magnetic field Hex1 magnetic domains 195–197 have their respective ends readily, initially transferred to reproducing layer 3. This principle will now be described with reference to FIGS. 27A–27D. As shown in FIG. 27A, if a signal is reproduced, reproducing layer 3 is initialized, magnetized in a predetermined direction. Furthermore, recording layer 5 has magnetic domains 220–222 having a signal recorded therein. Herein, a leaking magnetic field of magnetic domain 221 in a vertical direction, i.e., a direction to reproducing layer 3 has an intensity profile as shown in FIG. 27B.

In contrast, a leaking magnetic field of magnetic domain 221 in an in-plane direction has an intensity profile as shown in FIG. 27C. More specifically, it is a leaking magnetic fields having opposite directions and a uniform intensity at opposite ends of magnetic domain 221 and if the leaking magnetic field at the boundary of magnetic domains 220 and 221 is directed in the direction from magnetic domains 221 to 220 then the leaking magnetic field at the boundary of magnetic domains 221 and 222 is directed in the direction from magnetic domains 221 to 222. As such, a leaking magnetic field in the in-plane direction that comes from magnetic domain 221 to affect reproducing layer 3 has opposite directions and a uniform intensity, and a magnetic force acting to invert the reproducing layer 3 magnetization in the direction of the magnetic domain 221 magnetization is balanced at the opposite ends of magnetic domain 221. As a result, magnetic domain 221 does not have one end thereof preferentially transferred to reproducing layer 3.

However, when magnetic domain 221 receives a magnetic field containing magnetic field component having the in-plane direction, a leaking magnetic field in the in-plane direction that comes from magnetic domain 221 has an intensity profile as shown in FIG. 27D, and when a magnetic field is applied in a direction from magnetic domains 221 to 220 a leaking magnetic field 225 at the boundary of magnetic domains 221 and 220 is intensified as compared to a leaking magnetic field 226 at the other boundary thereof. As such, a leaking magnetic field 224 acts on the reproducing layer's magnetic domain 223 corresponding to an end of magnetic domain 221 closer to magnetic domain 220 to readily invert the magnetic domain 223 magnetization in the same direction as the magnetic domain 221 magnetization. As a result, if magnetic domain 221 is transferred to reproducing layer 3 it is transferred initially at an end thereof closer to magnetic domain 220 and in reproducing layer 3 at magnetic domain 223 there is created a species domain magnetized in the same direction as magnetic domain 221 is magnetized, and a magnetic field having a direction perpendicular to reproducing layer 3 that is the same direction as magnetic domain 221 is magnetized is applied to enlarge the species domain.

Thus, applying a magnetic field containing a magnetic field component having an in-plane direction facilitates transferring a magnetic domain to a reproducing layer.

Again with reference to FIGS. 26A and 26B, when alternating magnetic field Hex1 is applied to a magneto-optical recording medium at a predetermined angle to an in-plane direction of the recording medium and it is thus applied to each magnetic domain at a boundary thereof, and a laser beam LB is directed to enlarge and reproduce the magnetic domain, the following problem arise.

More specifically, when alternating magnetic field Hex1 is applied at a timing as shown in FIG. 26B at (a) and in the direction as indicated in FIG. 26A, only at a timing at which a positive (+) magnetic field 198 is applied to the boundaries of the magnetic domains having leaking magnetic fields 190, 192 and 194 recording layer 5 has magnetic domains 195–197 each transferred to and enlarged in reproducing layer 3 and a reproduced signal (b) is detected as shown in FIG. 26B. As such, if alternating magnetic field Hex1 is applied to the domains' boundaries having leaking magnetic fields 191 and 193, the magnetic domains are not transferred from recording layer 5 to reproducing layer 3. As a result, the magnetic domain 195 length having a domain length larger than a unit domain length cannot be detected accurately nor can magnetic domain 201, a domain adjacent to domain 195, be detected. More specifically, in reproduced signal (b) a component 199 indicates a start point of magnetic domain 195 and the component detected subsequent to component 199 is a component 200. As such the end point of magnetic domain 195 is thus not clearly indicated nor is the start point of magnetic domain 201, a domain adjacent to domain 195.

As such, if a magnetic domain is enlarged and reproduced by applying only alternating magnetic field Hex1 having a predetermined angle to an in-plane direction having a direction of a track of a magneto-optical recording medium, the magnetic domain is transferred and enlarged only at a boundary thereof having a leaking magnetic field intensified and it is not transferred or enlarged at a boundary thereof failing to have a leaking magnetic field intensified. As such, accurate signal reproduction cannot be achieved.

SUMMARY OF THE INVENTION

The present invention therefore contemplates a magneto-optical disk apparatus capable of accurately enlarging and reproducing a magnetic domain, and a method of reproducing the same.

The present invention provides a magneto-optical disk apparatus applying a laser beam and a magnetic field to reproduce a signal from a magneto-optical recording medium having a magnetic domain created therein to record a signal therein, including: a magnetic head applying a first alternating magnetic field to any magnetic domain at one edge existing in a direction of a track of the magneto-optical recording medium, and applying a second alternating magnetic field to the magnetic domain at the other edge existing in a direction of a track of the magneto-optical recording medium; and an optical head directing a first laser beam to the one edge and a second laser beam to the other edge, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

The present magneto-optical disk apparatus allows a magneto-optical recording medium to have any magnetic domain formed therein with one edge thereof receiving a first alternating magnetic field containing a magnetic field component increasing a component of a leaking magnetic field created at one edge and having an in-plane direction of the recording medium, and with the other edge receiving a second alternating magnetic field containing a magnetic field component increasing a component of a leaking magnetic field created at the other edge and having an in-plane direction of the recording medium. As such, each magnetic domain has opposite ends initially transferred and enlarged in reproducing a signal.

As such in the present invention if a magneto-optical recording medium has a magnetic domain having a different domain length to record a signal therein a reproduced signal attributed to a domain length can be detected and it can thus be reproduced accurately.

Furthermore, the present invention provides a magneto-optical disk apparatus applying a laser beam and a magnetic field to reproduce a signal from a magneto-optical recording medium having a magnetic domain created therein to record a signal therein, including: a drive signal generation circuit generating a drive signal including a first timing at which a first alternating magnetic field is applied and a second timing at which a second alternating magnetic field is applied; a magnetic head operating based on the drive signal to apply the first alternating magnetic field to any magnetic domain at one edge existing in a direction of a track of the magneto-optical recording medium, and operating based on the drive signal to apply the second alternating magnetic field to the magnetic domain at the other edge existing in the direction of the track; and an optical head directing a first laser beam to the one edge and a second laser beam to the other edge, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus there is generated a drive signal for generating for one edge of any magnetic domain in a magneto-optical recording medium a first alternating magnetic field containing a magnetic field component increasing a component of a leaking magnetic field created at one edge and having an in-plane direction of the recording medium, and for the other edge of the magnetic domain in the magneto-optical recording medium a second alternating magnetic field containing a magnetic field component increasing a component of a leaking magnetic field created at the other edge and having an in-plane direction of the recording medium. In response to the generated drive signal the first and second alternating magnetic fields are applied to the magneto-optical recording medium. Furthermore, one edge receives a first laser beam and the other edge receives a second laser beam. Consequently, the magneto-optical recording medium has each magnetic domain having opposite ends initially transferred and enlarged in reproducing a signal.

As such in the present invention if a magneto-optical recording medium has a magnetic domain having a different domain length to record a signal therein a reproduced signal attributed to a domain length can be detected and it can thus be reproduced accurately.

Furthermore, the present invention provides a magneto-optical disk apparatus applying a laser beam and a magnetic field to reproduce a signal from a magneto-optical recording medium having a magnetic domain created therein to record a signal therein, including: a first magnetic head applying a first alternating magnetic field to any magnetic domain at one edge existing in a direction of a track of the magneto-optical recording medium; a second magnetic head applying a second alternating magnetic field to the magnetic domain at the other edge existing in the direction of the track; a first optical head directing a first laser beam to the first edge; and a second optical head directing a second laser beam to the other edge, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus, a first magnetic head applies a first alternating magnetic field to any magnetic domain at one edge and a second magnetic head applies a second alternating magnetic field to any magnetic domain at the other edge. Furthermore, a first optical head directs a first laser beam to any magnetic domain at one edge and a second optical head applies a second laser beam to any magnetic domain at the other edge. As such, a magneto-optical recording medium has any magnetic domain having opposite ends initially transferred and enlarged in reproducing a signal.

Thus in the present invention if the first magnetic head applies the first alternating magnetic field having a center matching an optical axis of the first laser beam directed from the first optical head and the second magnetic head applies the second alternating magnetic field having a center matching an optical axis of the second laser beam directed by the second optical head, the first magnetic head is not required to be close to the second magnetic head (or the optical axis of the first laser beam is not required to be that of the second laser beam) to allow the magneto-optical recording medium to have any magnetic domain having opposite ends initially transferred and enlarged to accurately reproduce a signal.

Furthermore the present invention provides a magneto-optical disk apparatus applying a laser beam and a magnetic field to reproduce a signal from a magneto-optical recording medium having a magnetic domain created therein to record a signal therein, including: a drive signal generation circuit generating a first drive signal including a first timing at which a first alternating magnetic field is applied, and a second drive signal including a second timing at which a second alternating magnetic field is applied; a first magnetic head operating based on the first drive signal to apply the first alternating magnetic field to any magnetic domain at one edge existing in a direction of a track of the magneto-optical recording medium; a second magnetic head operating based on the second drive signal to apply the second alternating magnetic field to the magnetic domain at the other edge existing in the direction of the track; a first optical head directing a first laser beam to the one edge; and a second optical head directing a second laser beam to the other edge, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus a drive signal generation circuit generates a first drive signal provided to apply a first alternating magnetic field to a magnetic domain at one edge and a second drive signal provided to apply a second alternating magnetic field to a magnetic domain at the other edge. In response to the first drive signal a first magnetic head applies the first alternating magnetic field to a magneto-optical recording medium. In response to the second drive signal a second magnetic head applies the second alternating magnetic field to the magneto-optical recording medium. A first optical head directs a first laser beam to one edge of a magnetic domain created in the magneto-optical optical recording medium. A second optical head directs a second laser beam to the other edge of a magnetic domain created in the magneto-optical recording medium. Thus the magnetic domain has opposite ends initially enlarged in reproducing a signal.

Thus in the present invention two drive signals can be used to apply an alternating magnetic field allowing any magnetic domain to have opposite ends initially transferred and enlarged. Thus a signal can be reproduced accurately.

Furthermore, the present invention provides a magneto-optical disk apparatus applying a laser beam and a magnetic field to reproduce a signal from a magneto-optical recording medium having a magnetic domain created therein to record a signal therein, including: a magnetic head applying a first alternating magnetic field to any magnetic domain at one edge existing in a direction of a track of the magneto-optical recording medium, and applying a second alternating magnetic field to the magnetic domain at the other edge existing in a direction of a track of the magneto-optical recording medium; and an optical head directing a first laser beam to the one edge and a second laser beam to the other edge; and a composite circuit compositing together a first magneto-optical signal reproduced by applying the first alternating magnetic field and directing the first laser beam and a second magneto-optical signal reproduced by applying the second alternating magnetic field and directing the second laser beam, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus a first magneto-optical signal is detected at one edge of any magnetic domain created in a magneto-optical recording medium and a second magneto-optical signal is detected at the other edge of any magnetic domain created in the magneto-optical recording medium. The first and second magneto-optical signals detected are composited together.

Thus in the present invention a reproduced signal can be detected from opposite ends any magnetic domain and a signal can be reproduced accurately without depending on a domain length of each magnetic domain.

Furthermore, the present invention provides a magneto-optical disk apparatus applying a laser beam and a magnetic field to reproduce a signal from a magneto-optical recording medium having a magnetic domain created therein to record a signal therein, including: a drive signal generation circuit generating a drive signal including a first timing at which a first alternating magnetic field is applied and a second timing at which a second alternating magnetic field is applied; a magnetic head operating based on the drive signal to apply the first alternating magnetic field to any magnetic domain at one edge existing in a direction of a track of the magneto-optical recording medium, and operating based on the drive signal to apply the second alternating magnetic field to the magnetic domain at the other edge existing in the direction of the track; and an optical head directing a first laser beam to the one edge and a second laser beam to the other edge; and a composite circuit compositing together a first magneto-optical signal detected at the first timing and a second magneto-optical signal detected and the second timing, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus, a first alternating magnetic field is applied to any magnetic domain at one edge at a first timing included in a drive signal generated by a drive signal generation circuit and a second alternating magnetic field is applied to any magnetic domain at the other edge at a timing included in the drive signal generated by the drive signal generation circuit. Furthermore, a first laser beam is directed to any magnetic domain at one edge and a second laser beam is directed to any magnetic domain at the other edge. The two magneto-optical signals detected are composited together.

Thus in the present invention a drive signal can be used to apply alternating magnetic fields to any magnetic domain at opposite ends thereof to detect two magneto-optical signals from a magnetic domain at opposite ends. Since the detected two magneto-optical signals are composited together, a reproduced signal can be obtained depending on a domain length of each magnetic domain and a signal can thus be reproduced accurately.

Furthermore the present invention provides a magneto-optical disk apparatus applying a laser beam and a magnetic field to reproduce a signal from a magneto-optical recording medium having a magnetic domain created therein to record a signal therein, including: a first magnetic head applying a first alternating magnetic field to any magnetic domain at one edge existing in a direction of a track of the magneto-optical recording medium; a second magnetic head applying a second alternating magnetic field to the magnetic domain at the other edge existing in the direction of the track; a first optical head directing a first laser beam to the one edge; and a second optical head directing a second laser beam to the other edge; and a composite circuit compositing together a first magneto-optical signal reproduced by applying the first alternating magnetic field and directing the first laser beam and a second magneto-optical signal reproduced by applying the second alternating magnetic field and directing the second laser beam, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus, two magnetic heads are used to apply two alternating magnetic fields to any magnetic domain at opposite ends and two optical heads are used to direct two laser beams to any magnetic domain at opposite ends. Then, attributed to any magnetic domain having opposite ends initially transferred and enlarged, two magneto-optical signals are detected, and the detected two magneto-optical signals are composited together.

As such in the present invention if the first alternating magnetic field has a center matching an optical axis of the first laser beam and the second alternating magnetic field has a center matching an optical axis of the second laser beam then attributed to any magnetic domain having opposite ends initially transferred and enlarged there can be detected two magneto-optical signals which are in turn composited together to obtain a reproduced signal depending on a domain length of each magnetic domain. Furthermore, the first alternating magnetic field is not required to have its center close to the center of the second alternating magnetic field (or the first laser beam is not required to have its optical axis close to the optical axis of the second laser beam) and two magnetic heads or two optical heads can thus be readily arranged.

Furthermore the present invention provides a magneto-optical disk apparatus applying a laser beam and a magnetic field to reproduce a signal from a magneto-optical recording medium having a magnetic domain created therein to record a signal therein, including: a drive signal generation circuit generating a first drive signal including a first timing at which a first alternating magnetic field is applied, and a second drive signal including a second timing at which a second alternating magnetic field is applied; a first magnetic head operating based on the first drive signal to apply the first alternating magnetic field to any magnetic domain at one edge existing in a direction of a track of the magneto-optical recording medium; a second magnetic head operating based on the second drive signal to apply the second alternating magnetic field to the magnetic domain at the other edge existing in the direction of the track; a first optical head directing a first laser beam to the one edge; and a second optical head directing a second laser beam to the other edge; and a composite circuit compositing together a first magneto-optical signal detected at the first timing and a second magneto-optical signal detected at the second timing, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present magneto-optical disk apparatus, a drive signal generation circuit generates first and second drive signals and in response to the first drive signal a first alternating magnetic field is applied to any magnetic domain at one edge and in response to the second drive signal a second alternating magnetic field is applied to any magnetic domain at the other edge. Furthermore, first and second laser beams are directed to one and the other edges, respectively, independently. Then, attributed to any magnetic domain having opposite ends initially transferred and enlarged two magneto-optical signals are detected and the detected two magneto-optical signals are composited together.

Thus in the present invention two drive signals can be used to apply two alternating magnetic fields to any magnetic domain at opposite ends and attributed to any magnetic domain having opposite ends initially transferred and enlarged there can be detected two magneto-optical signals to obtain a reproduced signal depending on a domain length of each magnetic domain.

Preferably the magneto-optical disk apparatus further includes a delay time calibration circuit determining an optimal phase difference between a first detection signal obtained by reproducing through the first alternating magnetic field and the first laser beam a recorded signal corresponding to an alternation of a magnetic domain representing a unit bit of 1 and a magnetic domain representing a unit bit of 0 and a second detection signal obtained by reproducing the recorded signal through the second alternating magnetic field and the second laser beam, the optimal phase difference corresponding to a clock count corresponding to a distance between an optical axis of the first laser beam and an optical axis of the second laser beam. Furthermore, the composite circuit composites the first magneto-optical signal and the second magneto-optical signal together based on the optimal phase difference.

An adjustment is made to provide an optimal phase difference between a first detection signal obtained through a first alternating magnetic field and a first laser beam and a second detection signal obtained through a second alternating magnetic field and a second laser beam. Then, first and second magneto-optical signals are detected and the first and second magneto-optical signals have their phase difference set to be the optimal phase difference and the two magneto-optical signals are thus composited together.

Thus, in the present invention, attributed to any magnetic domain having opposite ends initially transferred and enlarged, there can be detected two magneto-optical signals which are in turn composited together to accurately obtain a reproduced signal depending on a domain length of each magnetic domain.

Furthermore, preferably when in the magneto-optical disk apparatus L represents a distance between the optical axis of the first laser beam and the optical axis of the second laser beam and d represents a length of a magnetic domain created in the magneto-optical recording medium and representing a unit bit, as seen in the direction of the track, L/d represents the clock count corresponding to the distance between the optical axis of the first laser beam and the optical axis of the second laser beam.

For a magnetic domain, first and second magneto-optical signals have therebetween an optimal phase difference determined as a clock count corresponding to a distance between the optical axes of two laser beams.

Thus in the present invention if two laser beams have their respective optical axes spaced by a unit domain length provided in a magneto-optical recording medium that is multiplied by an integer then two magneto-optical signals can be accurately composited together with an optimal phase difference.

Furthermore, the present invention provides a signal reproduction method applying a laser beam and a magnetic field to reproduce a signal from a magneto-optical recording medium having a magnetic domain created therein to record a signal therein, including: a first step of applying a first alternating magnetic field and directing a first laser beam to any magnetic domain at one edge existing in a direction of a track of the magneto-optical recording medium, and applying a second alternating magnetic field and directing a second laser beam to the magnetic domain at the other edge existing in the direction of the track of the magneto-optical recording medium; a second step of detecting a first magneto-optical signal through the first alternating magnetic field and the first laser beam and a second magneto-optical signal through the second alternating magnetic field and the second laser beam; and a third step of compositing the first and second magneto-optical signals together, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present signal reproduction method, attributed to any magnetic domain created in a magneto-optical recording medium and having opposite ends initially transferred and enlarged two magneto-optical signals are detected which are in turn composited together to obtain a reproduced signal.

Thus in the present invention there can be obtained a reproduced signal depending on a domain length of each magnetic domain and hence accurately.

Furthermore the present invention provides a signal reproduction method applying a laser beam and a magnetic field to reproduce a signal from a magneto-optical recording medium having a magnetic domain created therein to record a signal therein, including: a first step of applying a first alternating magnetic field and directing a first laser beam to any magnetic domain at one edge existing in a direction of a track of the magneto-optical recording medium, and applying a second alternating magnetic field and directing a second laser beam to the magnetic domain at the other edge existing in the direction of the track of the magneto-optical recording medium; a second step of determining an optimal phase difference between a first detection signal obtained by reproducing through the first alternating magnetic field and the first laser beam a recorded signal corresponding to an alternation of a magnetic domain representing a unit bit of 1 and a magnetic domain representing a unit bit of 0 and a second detection signal obtained by reproducing the recorded signal through the second alternating magnetic field and the second laser beam, the optimal phase difference corresponding to a clock count corresponding to a distance between an optical axis of the first laser beam and an optical axis of the second laser beam; a third step of detecting a first magneto-optical signal through the first alternating magnetic field and the first laser beam and a second magneto-optical signal through the second alternating magnetic field and the second laser beam; and a fourth step of setting a phase difference between the first and second magneto-optical signals to be the optimal phase difference determined at the second step, and compositing the first and second magneto-optical signals together, wherein the first alternating magnetic field contains a magnetic field component having a predetermined angle to a plane of the direction of the track and increasing an in-plane component of a leaking magnetic field created at the one edge, and the second alternating magnetic field contains a magnetic field component having a predetermined angle to a plane of the direction of the track and increasing an in-plane component of a leaking magnetic field created at the other edge.

In the present signal reproduction method, a first detection signal obtained through a first alternating magnetic field and a first laser beam and a second detection signal obtained through a second alternating magnetic field and a second laser beam have therebetween a phase difference set to be an optimal phase difference. Then, first and second magneto-optical signals are detected and the detected two magneto-optical signals have their phase difference set to be the optimal phase difference and the two magneto-optical signals are thus composited together.

Thus in the present invention there can be obtained a reproduced signal corresponding to each domain length provided in a magneto-optical recording medium.

Preferably, when L represents a distance between the optical axis of the first laser beam and the optical axis of the second laser beam and d represents a length of a magnetic domain created in the magneto-optical recording medium and representing a unit bit, as seen in the direction of the track, L/d represents the clock count corresponding to the distance between the optical axis of the first laser beam and the optical axis of the second laser beam.

For a magnetic domain, first and second magneto-optical signals have therebetween an optimal phase difference determined as a clock count corresponding to a distance between the optical axes of two laser beams and the two magneto-optical signals are thus composited together.

Thus in the present invention if two laser beams have their respective optical axes spaced by a unit domain length provided in a magneto-optical recording medium that is multiplied by an integer then two magneto-optical signals can be composited together with an optimal phase difference. Thus a signal can be reproduced accurately.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 10A is a plan view showing a configuration of the FIG. 1 magneto-optical recording medium, FIG. 10B is a plan view showing a configuration of a photodetector included in the FIG. 6 optical head, and FIG. 10C is a diagram of a circuit outputting a magneto-optical signal and a fine clock mark signal;

FIG. 11A is a plan view showing a configuration of the FIG. 1 magneto-optical recording medium, and FIG. 11B is timing charts representing a fine clock mark signal, a fine clock mark detection signal and a clock;

DESCRIPTION OF THE PREFERRED EMBODIMENTS

Figure 1:
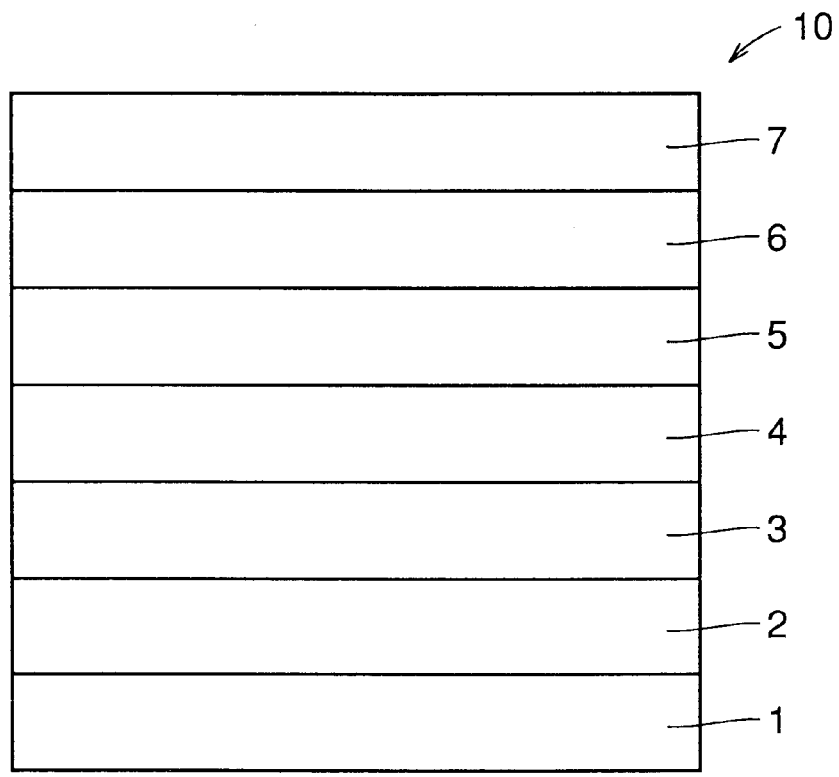
FIG. 1 shows a structure in cross section of a magneto-optical recording medium.

The embodiments of the present invention will now be described with reference to the drawings. With reference to FIG. 1, the present invention reproduces a signal from a magneto-optical recording medium 10 including a transparent substrate 1, an underlying layer 2, a reproducing layer 3, a non-magnetic layer 4, a recording layer 5, a non-magnetic layer 6 and a protection layer 7.

Transparent substrate 1 is formed for example of glass, polycarbonate or the like. Underlying layer is formed of SiN. Reproducing layer 3 is formed of GdFeCo. Non-magnetic layer 4 is formed of SiN. Recording layer 5 is formed of TbFeCo. Non-magnetic layer 6 is formed of Al or SiN. Protection layer 7 is formed of UV ray cured resin. Furthermore, underlying layer 2, reproducing layer 3, non-magnetic layer 4, recording layer 5, and non-magnetic layer 6 are sputtered, as well known. Protection layer 7 is provided by spin-coating.

Figure 2A:
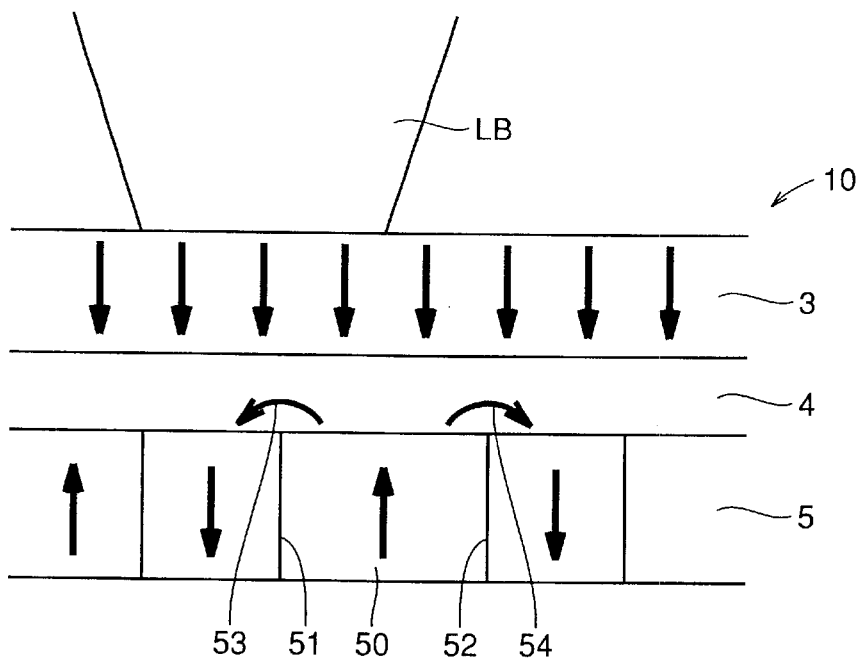
FIG. 2A conceptually shows a configuration in cross section of the FIG. 1 magneto-optical recording medium with its reproducing layer and recording layer magnetized.
Figure 2B:
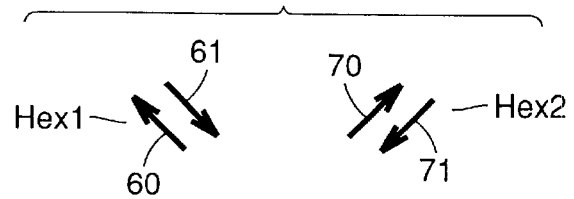
FIG. 2B represents an alternating magnetic field applied to the reproducing layer and recording layer shown in FIG. 2A.

With reference to FIG. 2A, in reproducing a signal from magneto-optical recording medium 10, recording layer 5 has each magnetic domain magnetized in a direction opposite to each other and reproducing layer 3 is initialized or magnetized in a predetermined direction. Furthermore, recording layer 5 has a magnetic domain 50 having one edge 51 with a leaking magnetic field 53 containing a component in an in-plane direction and the other edge 52 with a leaking magnetic field 54 containing a component in an in-plane direction. In the present invention, one edge 51 receives an alternating magnetic field Hex1 while the other edge 52 receives an alternating magnetic field Hex2 to enlarge and reproduce a magnetic domain. Herein, a laser beam LB is directed to one edge 51 or the other edge 52. With reference to FIG. 2B, alternating magnetic field Hex1 includes magnetic field components 60 and 61 and alternating magnetic field Hex2 includes magnetic field components 70 and 71.

Figure 2C:
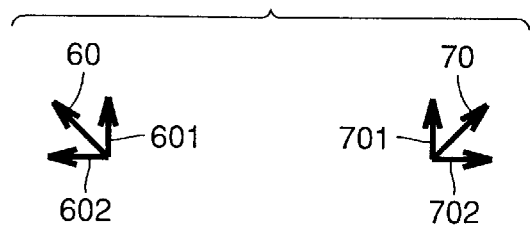
FIG. 2C represents a component of the FIG. 2B alternating magnetic field.

With reference to FIG. 2C, magnetic field component 60 is composed of a component 601 perpendicular to recording layer 5 and a component 602 parallel to recording layer 5. Component 602 has the same direction as the in-plane component of leaking magnetic field 53. As such, magnetic field component 60 contains a component increasing in intensity the in-plane component of leaking magnetic field 53.

Magnetic field component 70 is composed of a component 701 perpendicular to recording layer 5 and a component 702 parallel to recording layer 5. Component 702 has the same direction as an in-plane component of leaking magnetic field 54. As such, magnetic field component 70 contains a component increasing in intensity the in-plane component of leaking magnetic field 54.

As such, applying alternating magnetic fields Hex1 and Hex2 to one and the other edges 51 and 52, respectively, allows magnetic domain 50 to have opposite ends thereof initially transferred to and enlarged in reproducing layer 3 to obtain a reproduced signal corresponding to the magnetic domain 50 length. Herein, applying alternating magnetic field Hex1 can intensify not only an in-plane component of leaking magnetic field 53 but a vertical component of leaking magnetic field 53. Furthermore, applying alternating magnetic field Hex2 can intensify not only an in-plane component of leaking magnetic field 54 but a vertical component of leaking magnetic field 54. This facilitates transferring a magnetic domain from recording layer 5 to reproducing layer 3 and enlarging it therein.

Figure 3:
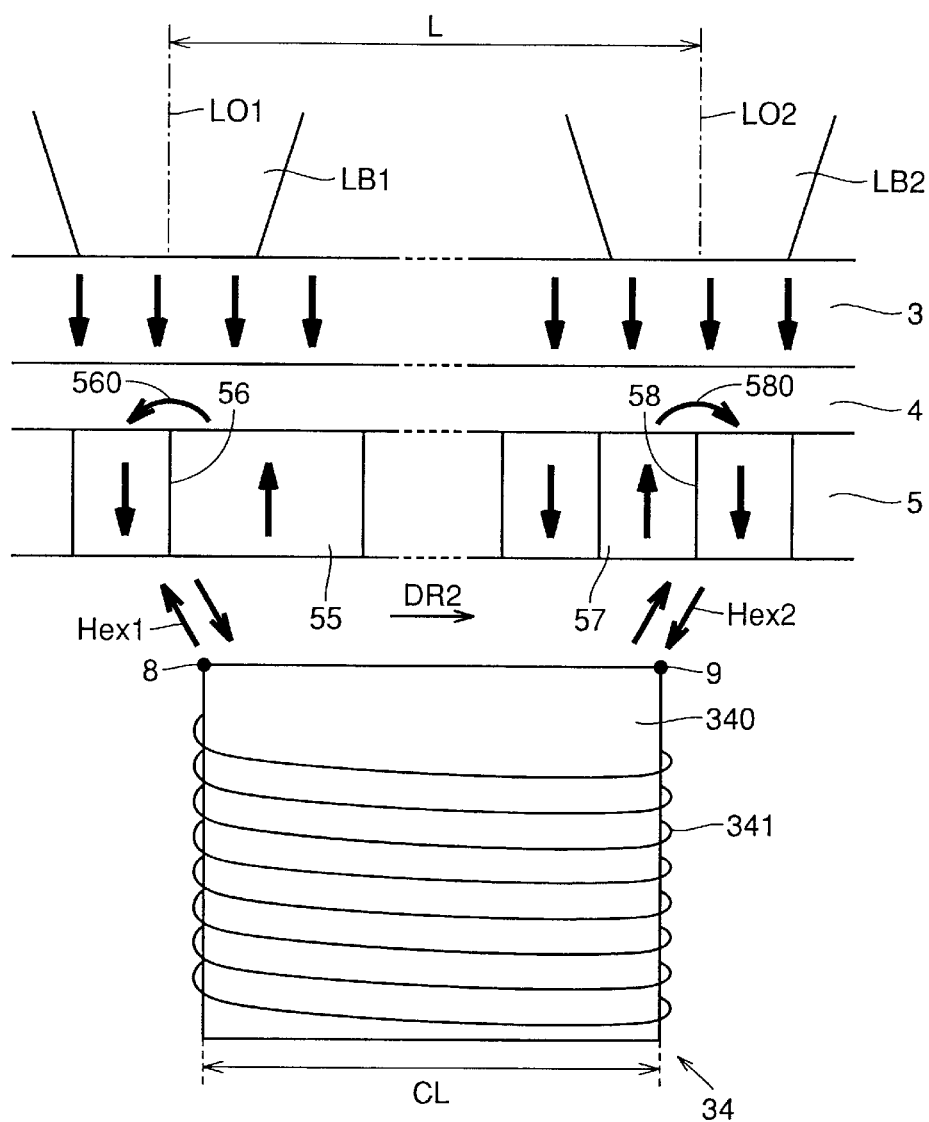
FIG. 3 illustrates a signal reproduction method in accordance with the present invention.

Reference will now be made to FIG. 3 to describe a specific manner of signal detection that is attributed to each magnetic domain provided in recording layer 5 of a magneto-optical recording medium and having opposite ends initially trtransferred and enlarged. A magnetic head 34 is formed of a core 430 and a coil 341 wound around core 340 and changing the direction of the current through coil 341 can produce a first alternating magnetic field Hex1 at the core's edge 8 and a second alternating magnetic field Hex2 at the core's edge 9. Furthermore, as seen in a direction DR2, a direction of a track of the recording medium, core 340 has a length CL set to be approximately a unit domain length in recording layer 5 that is multiplied by an integer. For example, if recording layer 5 has a unit domain length of 0.2 μm, then length CL would be set to be 200 μm. Since recording layer 5 has each magnetic domain having a domain length corresponding to a unit domain length multiplied by an integer, setting length CL to be the unit domain length multiplied by an integer allows alternating magnetic fields Hex1 and Hex2 to be applied to edges 56 and 58, respectively. Note that if length CL is not equal to the distance between edges 56 and 58, alternating magnetic fields Hex1 and Hex2 can be applied to edges 56 and 58, respectively. More specifically, if edge 56 and the core 340 edge 8 are not aligned on a single line having a direction of a normal to magneto-optical recording medium 10 or edge 58 and the core 340 edge 9 are not aligned on a single line having a direction of a normal to the recording medium, edges 56 and 58 receive alternating magnetic fields Hex1 and Hex2, respectively.

Furthermore, a laser beam LB1 is directed to have its optical axis L01 matching edge 56 and a laser beam LB2 is directed to have its optical axis L2 matching edge 58.

Magnetic domain 55 has edge 56 with a leaking magnetic field 560 containing a component in an in-plane direction, and magnetic domain 57 has edge 58 with a leaking magnetic field 580 containing a component in an in-plane direction. Furthermore, as has been described previously with reference to FIGS. 2B and 2C, the first alternating magnetic field Hex1 contains a magnetic field component increasing in intensity an in-plane component of leaking magnetic field 560 and the second alternating magnetic field Hex2 contains a magnetic field component increasing in intensity an in-plane component of leaking magnetic field 580. As such, alternating magnetic field Hex1 and laser beam LB1 can be used to transfer magnetic domain 55 initially at the edge 56 side through non-magnetic layer 4 to reproducing layer 3 and enlarge the transferred magnetic domain in reproducing layer 3 and detect it therein, and alternating magnetic field Hex2 and laser beam LB2 can be used to transfer magnetic domain 57 initially at the edge 58 side through non-magnetic layer 4 to reproducing layer 3 and enlarge the transferred magnetic domain in reproducing layer 3 and detect it therein. Although neither magnetic domains 55 nor 57 have their respective opposite edges initially, simultaneously transferred to reproducing layer 3 and enlarged therein, with the magneto-optical recording medium rotating, magnetic domains 55 and 57 have their respective opposite edges initially transferred to and enlarged in reproducing layer 3 with a phase difference corresponding to length CL and it is thus detected as a reproduced signal.

In the present invention, leaking magnetic fields 560 and 580 are different in polarity and alternating magnetic field Hex1 is required to be applied an edge having a leaking magnetic field having the same polarity as leaking magnetic field 560 and alternating magnetic field Hex2 is required to be applied to an edge having a leaking magnetic field having the same polarity as leaking magnetic field 580. As such, if alternating magnetic field Hex1 and alternating magnetic field Hex2 are applied to edges having leaking magnetic fields of the same polarity, each magnetic domain would not have opposite edges initially transferred and enlarged.

Figure 4A:
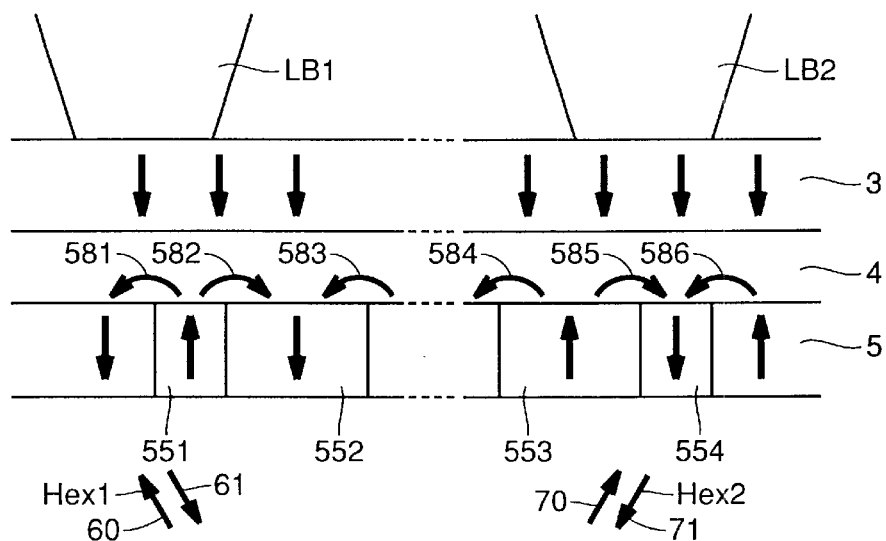
FIG. 4A is a conceptual cross section for illustrating a method of enlarging and reproducing a magnetic domain, with a reproducing layer and a recording layer magnetized.
Figure 4B:
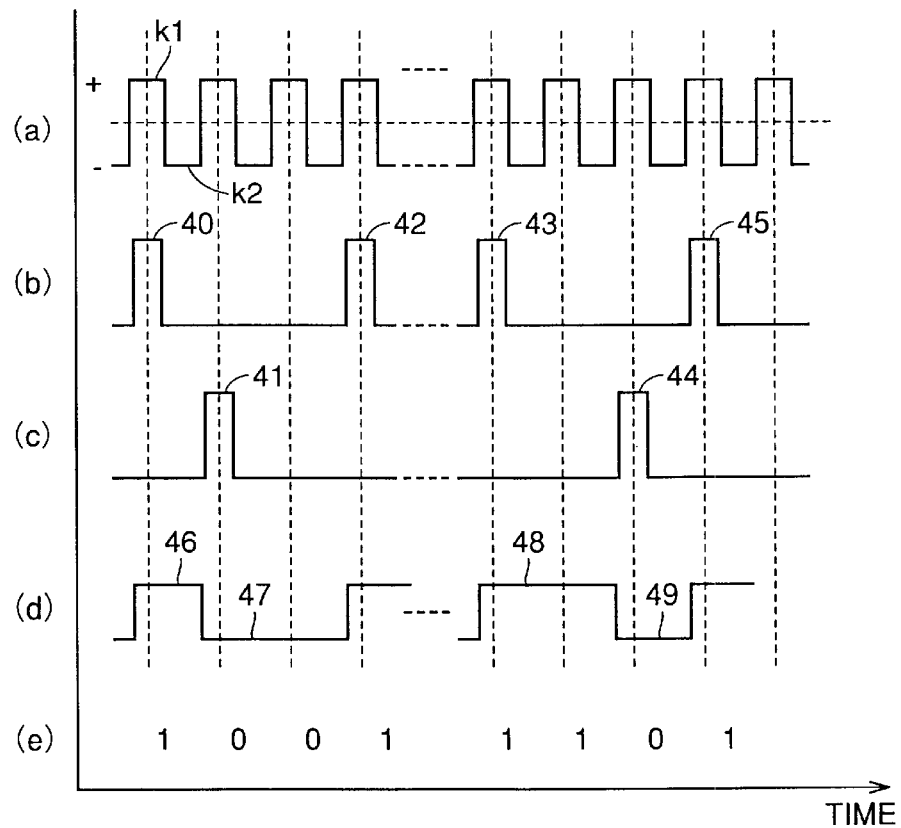
FIG. 4B represents a reproduced signal detected from the FIG. 4A reproducing layer.

With reference to FIGS. 4A and 4B, alternating magnetic fields Hex1 and Hex2 and laser beams LB1 and LB2 are used to enlarge and reproduce a magnetic domain, as will be described hereinafter. Recording layer 5 has magnetic domains 551–554 formed therein and having their respective edges with leaking magnetic fields 581–586, respectively. The edges having leaking magnetic fields 581, 583, 584, 586 of the same polarity receive alternating magnetic field Hex1 containing magnetic field component 60 increasing in intensity an in-plane component of leaking magnetic fields 581, 583, 584, 586 and the edges are irradiated with laser beam LB1. The edges having leaking magnetic fields 582 and 585 opposite in polarity to leaking magnetic fields 581, 583, 584, 586 receive alternating magnetic field Hex2 containing magnetic field component 70 increasing in intensity an in-plane component of leaking magnetic fields 582 and 585 and the edges are also irradiated with laser beam LB2.

Alternating magnetic fields Hex1 and Hex2 are applied to the edges of the magnetic domains, depending on the magnetic field polarity as shown in FIG. 4B at (a). More specifically, depending on a component k1, alternating magnetic field Hex1 has magnetic field component 60 applied to an edge having leaking magnetic field 581 and alternating magnetic field Hex2 has magnetic field component 70 applied to an edge having leaking magnetic field 585, and laser beam LB1 is directed to the edge having leaking magnetic field 581 and laser beam LB2 is directed to the edge having leaking magnetic field 585. As such, magnetic domain 551 at an edge thereof with leaking magnetic field 581 is initially transferred to and enlarged in reproducing layer 3, and magnetic domain 553 at an edge thereof with leaking magnetic field 585 is initially transferred to and enlarged in reproducing layer 3. Then, laser beam LB1 detects magnetic domain 551 as a component 40 of signal (b) and laser beam LB2 detects magnetic domain 553 as a component 44 of signal (c). After the signal (b) component 40 and the signal (c) component 44 have been detected, depending on a component k2 of magnetic field polarity (a) alternating magnetic field Hex1 has magnetic field component 61 applied to the edge having leaking magnetic field 581 and alternating magnetic field Hex2 has magnetic field component 71 applied to the edge having leaking magnetic field 585. This erases a magnetic domain transferred to and enlarged in reproducing layer 3. This process is repeated to allow signal (b) to be detected through alternating magnetic field Hex1 and laser beam LB1 and signal (c) to be detect through alternating magnetic field Hex2 and laser beam LB2.

Detected signals (b) and (c) can be composited to obtain a reproduced signal (d). Signals (b) and (c) are composited as follows: when in signal (b) component 40 is detected a logical high level is attained and the logical high level is then maintained and when in signal (c) component 41 is detected a logical low level is attained and the logical low level is held until in signal (b) component 42 is detected. Thus, there can be obtained components 46 and 47 of reproduced signal (d). By repeating the same operation there can be obtained components 48, 49 of reproduced signal (d) from the signal (b) components 43 and 45 and the signal (c) component 44. Consequently, reproduced signal (d) can have components 46, 47, 48 and 49 corresponding to the recording layer's magnetic domains 551, 552, 553 and 554, respectively, to provide a reproduced signal corresponding to the domain length of each magnetic domain provided in recording layer 5. In reproduced signal (d), components 46, 47, 48 and 49 can represent one bit of "1", two bits of "00", two bits of "11" and one bit of "0", respectively, and reproduced signal (d) can provide reproduced data (e).

Note that although if a magnetic domain has a magnetic domain length in the direction of the track of the recording medium that is no less than twice a magnetic domain length of a unit bit the magnetic domain can have its center receiving alternating magnetic field Hex1 or Hex2, in the present invention there can be applied alternating magnetic field Hex1 or Hex2 having a peak intensity weaker than that of an alternating magnetic field applied in a direction perpendicular to recording layer 5 to transfer a magnetic domain from recording layer 5 to reproducing layer 3 and enlarge the magnetic domain in the reproducing layer. As such, the magnetic domain would not have it center initially transferred or enlarged. Furthermore, if a magnetic domain has a large length in the direction of the track of the recording medium, its center has a vertical, leaking magnetic field weaker in intensity than its edge and the magnetic domain would thus hardly have its center initially transferred and enlarged. Furthermore, if non-magnetic layer 4 is adapted to have a thickness set to prevent a magnetic domain from having a center thereof with a leaking magnetic field initially reaching reproducing layer 3, the magnetic domain would not have the center initially transferred or enlarged. Thus, in the present invention, alternating magnetic fields Hex1 and Hex2 can be applied to allow each magnetic domain in recording layer 5 to have an edge thereof initially transferred to and enlarged in reproducing layer 3 and erased. Thus, the FIG. 4B signals (a) and (b) can be detected accurately.

Figure 5:
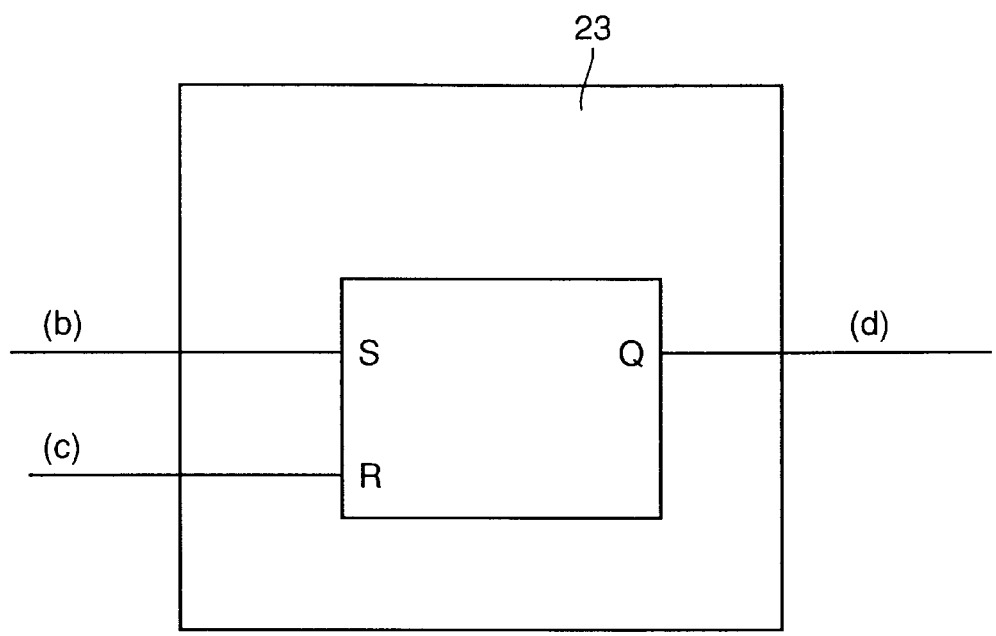
FIG. 5 is a circuit diagram of a composite circuit.

Reference will now be made to FIG. 5 to describe a composite circuit 23 composing signals (b) and (c) together. Composite circuit 23 is provided in the form of a S-R flip-flop having a terminal S receiving signal (b) and a terminal R receiving signal (c) to output reproduced signal (d) at a terminal Q.

As has been described with reference to FIGS. 4A and 4B, each magnetic domain can have one and the other edges receiving an alternating magnetic field increasing in intensity a leaking magnetic field of the edge, to allow each magnetic domain to have opposite edges detected clearly. Note that in the present invention, signal (b) detected through alternating magnetic field Hex1 and laser beam LB1 will be referred to as a "first magneto-optical signal" and signal (c) detected through alternating magnetic field Hex2 and laser beam LB2 will be referred to as a "second magneto-optical signal".

Figure 6:
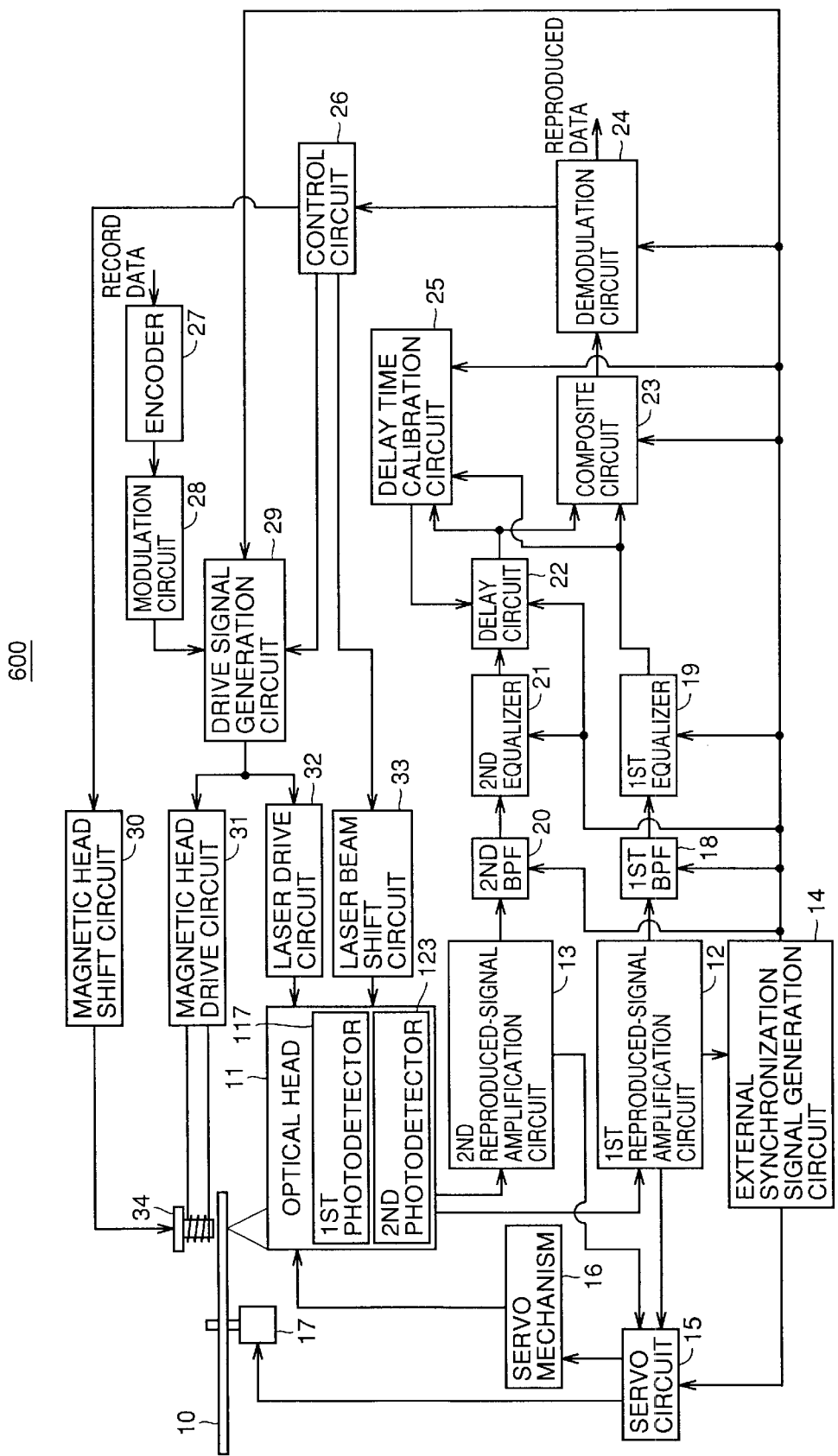
FIG. 6 is a block diagram showing a magneto-optical disk apparatus of the present invention.

Reference will now be made to FIG. 6 to describe a magneto-optical disk apparatus 600 in accordance with the present invention. Magneto-optical disk apparatus 600 includes an optical head 11, a first reproduced-signal amplification circuit 12, a second reproduced-signal amplification circuit 13, an external synchronization signal generation circuit 14, a servo circuit 15, a servo mechanism 16, a spindle motor 17, a first BPF 18, a first equalizer 19, a second BPF 20, a second equalizer 21, a delay circuit 22, a composite circuit 23, a demodulation circuit 24, a delay time calibration circuit 25, a control circuit 26, an encoder 27, a modulation circuit 28, a drive signal generation circuit 29, a magnetic head shift circuit 30, a magnetic head drive circuit 31, a laser drive circuit 32, a laser beam shift circuit 33, and a magnetic head 34.

Optical head 11 directs laser beams LB1 and LB2 to magneto-optical recording medium 10 and at a first photodetector 117 detects a reflection of laser beam LB1 and at a second photodetector 123 detects a reflection of laser beam LB2.

The first reproduced-signal amplification circuit 12 receives from the first photodetector 117 a focus error signal, a tracking error signal, the first magneto-optical signal and a fine clock mark signal described hereinafter, amplifies the signals to attain a predetermined level, and outputs the focus error signal and the tracking error signal to servo circuit 15, the first magneto-optical signal to the first BPF 18 and the fine clock mark signal to external synchronization signal generation circuit 14.

The second reproduced-signal amplification circuit 13 receives from the second photodetector 123 a focus error signal, a tracking error signal and the second magneto-optical signal, amplifies the signals to attain a predetermined level, and outputs the focus error signal and the tracking error signal to servo circuit 15 and the second magneto-optical signal to the second BPF 20.

External synchronization signal generation circuit 14 responds to the fine clock mark signal to generate a clock in a manner described hereinafter and outputs the generated clock to servo circuit 15, the first BPF 18, the first equalizer 19, the second BPF 20, the second equalizer 21, delay circuit 22, composite circuit 23, demodulation circuit 24, delay time calibration circuit 25 and drive signal generation circuit 29.

Servo circuit 15 responds to the focus error signal and tracking error signal received from the first reproduced-signal amplification circuit 12, to control servo mechanism 16 to focus-servo and tracking-servo an objective lens (not shown) provided in optical head 11 condensing and directing laser beam LB1 to magneto-optical recording medium 10, and servo circuit 15 responds to the focus error signal and tracking error signal received from the second reproduced-signal amplification circuit 13, to control servo mechanism 16 to focus-servo and tracking-servo an objective lens (not shown) provided in optical head 11 condensing and directing laser beam LB2 to magneto-optical recording medium 10. Furthermore, servo circuit 15 responds to a clock received from external synchronization signal generation circuit 14, to rotate spindle motor 17 at a predetermined rate.

Servo mechanism 16 is controlled by servo circuit 15 to focus-servo and tracking-servo the objective lens condensing and directing laser beam LB1 to magneto-optical recording medium 10 and the objective lens condensing and directing laser beam LB2 to magneto-optical recording medium 10. Spindle motor 17 rotates magneto-optical recording medium 10 at a predetermined rate.

The first BPF 18 is synchronized with a clock applied from external synchronization signal generation circuit 14, to cut the first magneto-optical signal at a high range and a low range. The first equalizer 19 is synchronized with a clock applied from external synchronization signal generation circuit 14, to remove an interference of a waveform of the first magneto-optical signal. The second BPF 20 is synchronized with a clock applied from external synchronization signal generation circuit 14, to cut the second magneto-optical signal at a high range and a low range. The second equalizer 21 is synchronized with a clock applied from external synchronization signal generation circuit 14, to remove an interference of a waveform of the second magneto-optical signal. Delay circuit 22 is synchronized with a clock applied from external synchronization signal generation circuit 14, to delay a phase of the second magneto-optical signal by an amount of delay output from delay time calibration circuit 25.

Composite circuit 23 is synchronized with a clock applied from external synchronization signal generation circuit 14, to composite together the first magneto-optical signal received from the first equalizer 19 and the second magneto-optical signal received from delay circuit 22. Demodulation circuit 24 is synchronized with a clock applied from external synchronization signal generation circuit 14, to demodulate a magneto-optical signal received from composite circuit 23 and output the demodulated signal as reproduced data.

Delay time calibration circuit 25 responds to a clock applied from external synchronization signal generation circuit 14, to detect a phase difference between the first magneto-optical signal received from the first equalizer 19 and the second magneto-optical signal received from delay circuit 22, determines in a manner described hereinafter an amount of delay for the second magneto-optical signal allowing the first and second magneto-optical signals to have an optimal phase difference and outputs the determined amount of delay to delay circuit 22.

Control circuit 26, as will be described hereinafter, receives a reproduced signal from demodulation circuit 24 and detects the received, reproduced signal's error rate when magnetic head 34 is to be positionally adjusted and laser beams LB1 and LB2 are to be positionally adjusted. Then, control circuit 26 controls magnetic head shift circuit 30 to move magnetic head 34 to a position minimizing the error rate of the reproduced signal and controls laser beam shift circuit 33 to move laser beam LB1 to a position minimizing the error rate of the reproduced signal. Control circuit 26 also controls drive signal generation circuit 29.

Encoder 27 encodes data to be recorded. Modulation circuit 28 modulates in a predetermined system a signal to be recorded. Drive signal generation circuit 29 in recording a signal on magneto-optical recording medium 10 responds to a clock applied from external synchronization signal generation circuit 14, to generate a drive signal for creating a magnetic field modulated by a record signal received from modulation circuit 28 and output the generated drive signal to magnetic head drive circuit 31. It also generates a drive signal for generating a laser beam having a fixed intensity and outputs the generated drive signal to laser drive circuit 32.

Drive signal generation circuit 29 in reproducing a signal from magneto-optical recording medium 10 generates a drive signal for generating alternating magnetic fields Hex1 and Hex2 and outputs the generated drive signal to magnetic head drive circuit 31. Drive signal generation circuit 29 also generates a drive signal for generating a laser beam having a fixed intensity and outputs the generated drive signal to laser drive circuit 32.

Magnetic head shift circuit 30 moves magnetic head 34 in a direction of a track of magneto-optical recording medium 10 in a manner described hereinafter. Magnetic head drive circuit 31 responds to a drive signal received from drive signal generation circuit 29, to drive magnetic head 34. Laser drive circuit 32 responds to a drive signal received from drive signal generation circuit 29, to drive a semiconductor laser (not shown) provided in optical head 11. Laser beam shift circuit 33 moves in the direction of the track of magneto-optical recording medium 10 an optical system generating laser beam LB1, in a manner described hereinafter. Magnetic head 34 applies a magnetic field to magneto-optical recording medium 10.

Figure 7:
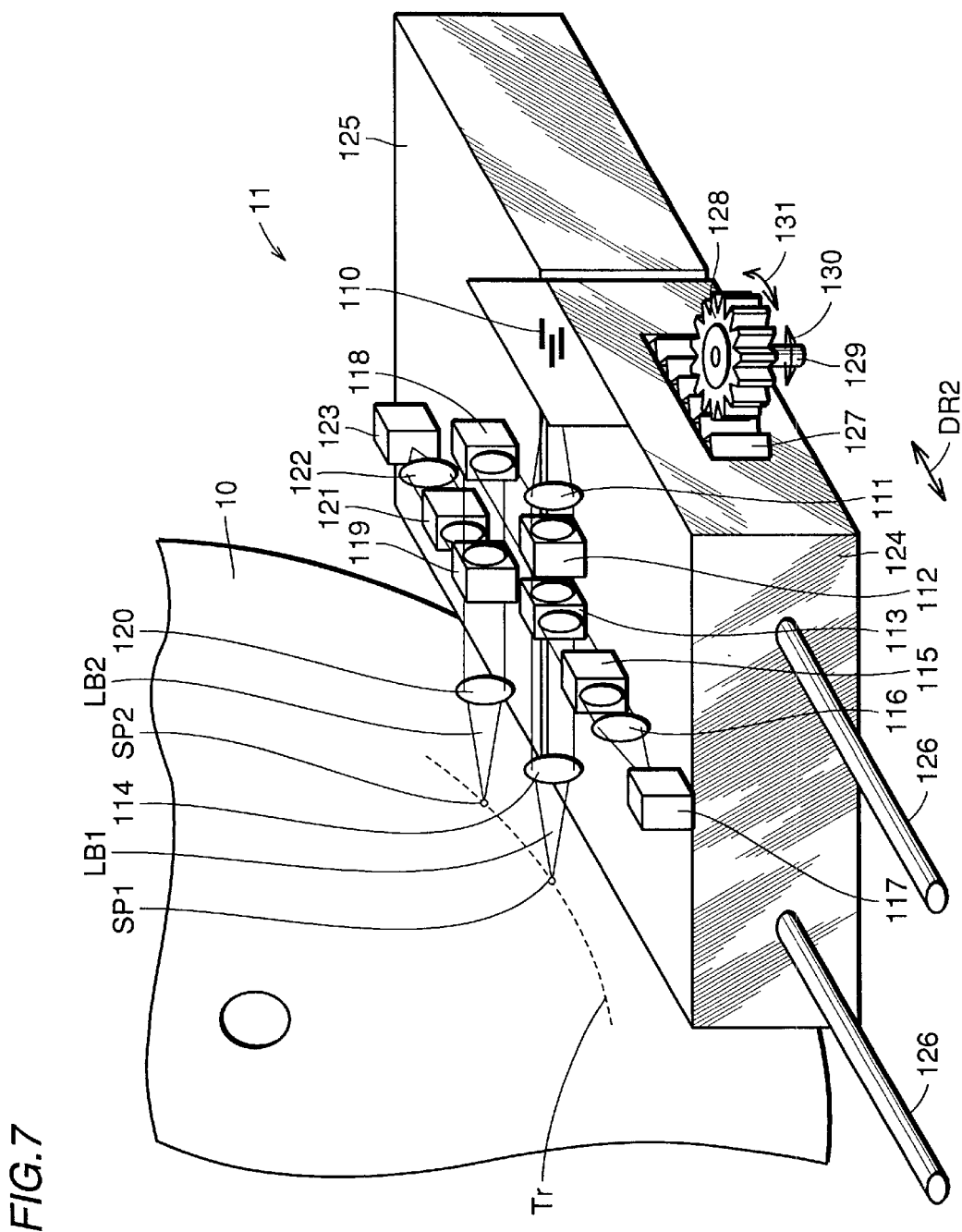
FIG. 7 shows a structure of an optical head of the FIG. 6 magneto-optical disk apparatus.

Reference will now be made to FIG. 7 to describe optical head 11 in detail. Optical head 11 includes a semiconductor laser 110, a collimator lens 111, a beam splitter 112, a half mirror 113, an objective lens 114, a Wollaston prism 115, a condenser lens 116, the first photodetector 117, a reflecting mirror 118, a half mirror 119, an objective lens 120, a Wollaston prism 121, a condenser lens 122, and the second photodetector 123.

Semiconductor laser 110 emits a laser beam having a wavelength of 635 nm. Collimator lens 111 collimates the laser beam emitted from semiconductor laser 110. Beam splitter 112 receives a laser beam from collimator lens 111 and splits it into laser beams LB1 and LB2, allowing laser beam LB1 to be incident on half mirror 113 and laser beam LB2 to be incident on reflecting mirror 118. Half mirror 113 transparently transmits laser beam LB1 received from beam splitter 112 and reflects in the direction of Wollaston prism 115 half a reflection of laser beam LB1 received from magneto-optical recording medium 10. Objective lens 114 condenses and directs laser beam LB1 to a spot SP1 on a track Tr of magneto-optical recording medium 10.

Wollaston prism 115 separates a reflection of light from half mirror 113 into a laser beam only of an S polarization component, a laser beam only of a P polarization component, and a laser beam having S and P polarization components mixed together. Condenser lens 116 condenses a laser beam. The first photodetector 117 detects a laser beam and outputs a focus error signal, a tracking error signal, the first magneto-optical signal and a fine clock mark signal in a manner described hereinafter. Reflecting mirror 118 reflects laser beam LB2 received from beam splitter 118. Half mirror 119 to transparently transmits laser beam LB2 received from reflecting mirror 118 and reflects in the direction of Wollaston prism 121 half a reflection of laser beam LB2 received from magneto-optical recording medium 10.

Objective lens 120 condenses and directs laser beam LB2 to a spot SP2 on track Tr of magneto-optical recording medium 10. Wollaston prism 121 separates a reflection of light from half mirror 119 into a laser beam only of an S polarization component, a laser beam only of a P polarization component and a laser beam having S and P polarization components mixed together.

Condenser lens 122 condenses a laser beam. The second photodetector 123 detects a laser beam and outputs a focus error signal, a tracking error signal and the second magneto-optical signal in a manner described hereinafter.

Semiconductor laser 110, collimator lens 111, beam splitter 112, half mirror 113, objective lens 114, Wollaston prism 115, condenser lens 116 and the first photodetector 117 are arranged on a platform 124, and reflecting mirror 118, half mirror 119, objective lens 120, Wollaston prism 121, condenser lens 122 and the second photodetector 123 are arranged on a platform 125. Platforms 124 and 125 are arranged to allow laser beams LB1 and LB2 to have their respective spots SPI and SP2 provided in a direction DR2, a direction of a track of magneto-optical recording medium 10. Furthermore, platform 124 has a side provided with a slider 127 engaging with a gear 128 having a shaft 129 connected to a motor (not shown) rotating in the direction of an arrow 130 to also rotate shaft 129 in the direction of arrow 130 to accordingly rotate gear 128 in the direction of arrow 131. As such, platform 124 is movable on rails 126 in direction DR2. Platform 125 is fixed to a base (not shown) of a magneto-optical disk apparatus 600. In response to a signal from laser beam shift circuit 33 a motor (not shown) rotates in the direction of arrow 130 to move platform 124 in direction DR2 to adjust the distance between laser beams LB1 and LB2.

Thus, moving platform 124 in direction DR2 can adjust the distance between spot SP1 of laser beam LB1 and spot SP2 of laser beam LB2 and such distance is set to be length CL of core 340 of magnetic head 34 as seen in direction DR2. Since beam splitter 112 allows laser beam LB2 to be incident on reflecting mirror 118 arranged in direction DR2, moving platform 124 in direction DR2 does not result in an optical axis being displaced.

Optical head 11 operates as will be described hereinafter. Laser drive circuit 32 drives semiconductor laser 110 to generate a laser beam and collimator lens 111 collimates the laser beam. Then beam splitter 112 splits the collimated laser beam into laser beams LB1 and LB2 which are in turn incident on half mirror 113 and reflecting mirror 118, respectively. Half mirror 113 transparently transmits laser beam LB1 and objective lens 114 condenses and directs laser beam LB1 to spot SP1 on track Tr of magneto-optical recording medium 10. Magneto-optical recording medium 10 reflects laser beam LB1, which in turn returns via objective lens 114 to half mirror 113, which reflects half of laser beam LB1 and allow the same to be incident on Wollaston prism 115, which in turn separates laser beam LB1 into a laser beam only of an S polarization component, a laser beam only of a P polarization component and a laser beam with S and P polarization components mixed together and condenser lens 116 condenses and directs the same to the first photodetector 117 for detection.

Furthermore, laser beam LB2 incident on reflecting mirror 118 is transparently transmitted through half mirror 119, condensed by objective lens 120, and directed to spot SP2 on track Tr of magneto-optical recording medium 10. Magneto-optical recording medium 10 reflects laser beam LB1, which in turn returns via objective lens 120 to half mirror 119, which reflects half of laser beam LB1 and allows the same to be incident on Wollaston prism 121, which separates laser beam LB1 into a laser beam only of an S polarization component, a laser beam only of a P polarization component and a laser beam having S and P polarization components mixed together, which are in turn condensed by condenser lens 122 and directed to the second photodetector 123 for detection.

Thus, optical head 11 employs a single semiconductor laser to generate a laser beam, separates the generated laser beam into laser beams LB1 and LB2 and directs laser beams LB1 and LB2 on track Tr of magneto-optical recording medium 10 to detect a signal from magneto-optical recording medium 10. Furthermore, optical head 11 can move in direction DR2 of a track of magneto-optical recording medium 10 an optical system condensing and directing laser beam LB1 to magneto-optical recording medium 10, to adjust the distance between laser beams LB1 and LB2.

Figure 8:
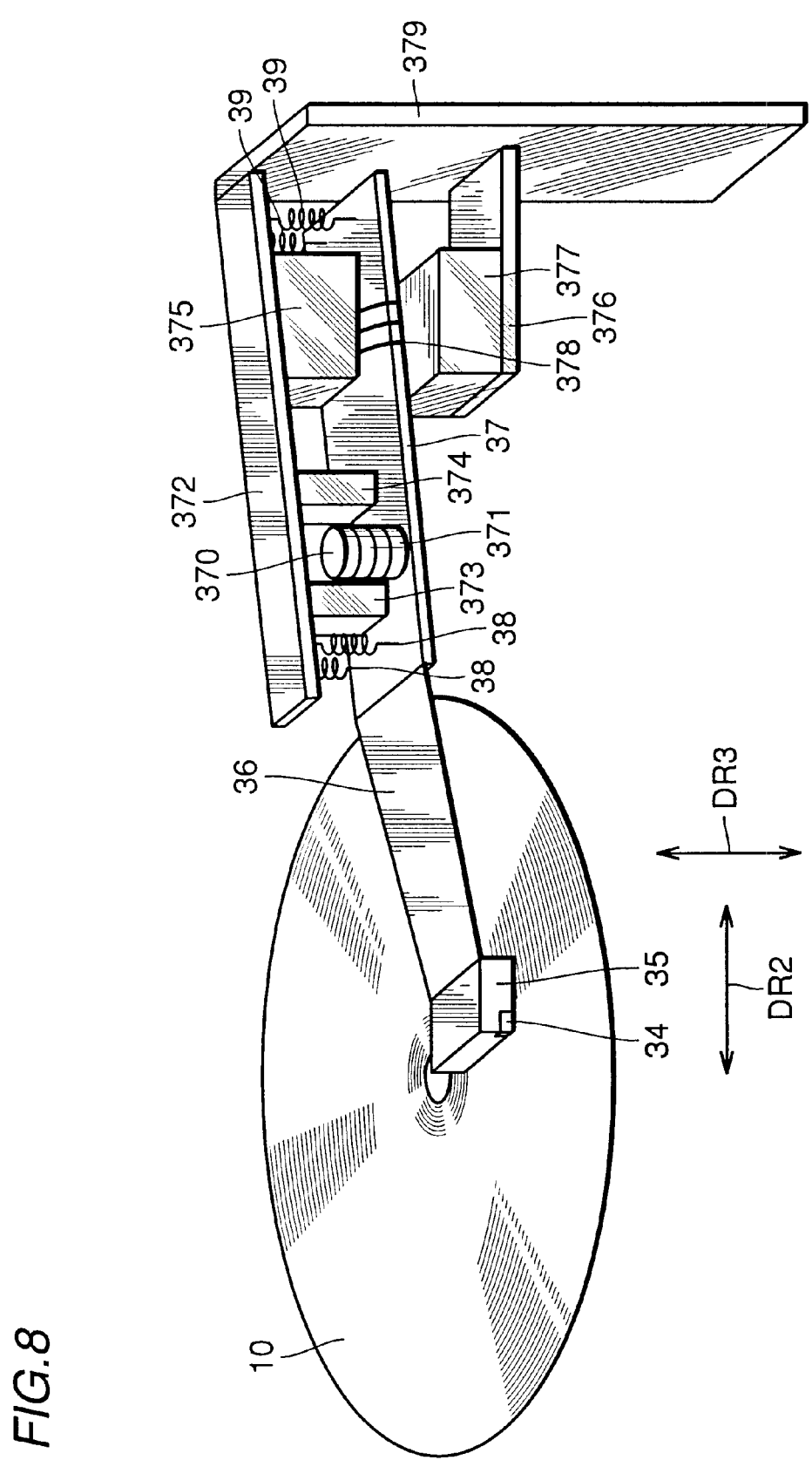
FIG. 8 is a perspective view for illustrating a mechanism moving the FIG. 6 magnetic head.

Reference will now be made to FIG. 8 to describe a mechanism moving magnetic head 34. Magnetic head 34 is arranged at a portion of slider 35 connected to an arm 36 connected to a supporting plate 37 connected via springs 38 and 39 to a ceiling plate 372 connected to a base 379. Ceiling plate 372 is provided with magnets 373–375 and between magnets 373 and 374 there exist a core 370 arranged on supporting plate 37 with a coil 371 wound therearound. A supporting plate 376, connected to base 379 and arranged opposite to supporting plate 37 with ceiling plate 372 therebetween, is provided thereon with a magnet 377 and between magnets 375 and 377 on supporting plate 37 a coil 378 is wound around.

Magnets 373 and 374 are of the same polarity. As such, when coil 371 passes current, coil 371 receives a magnetic force from magnets 373 and 374 and supporting plate 37 moves in a direction DR3 of a normal to magneto-optical recording medium 10. Arm 36 is a plate spring and as supporting plate 37 moves direction DR3 slider 35 is pressed against magneto-optical recording medium 10. Since supporting plate 37 is connected to ceiling plate 372 via springs 38 and 39, supporting plate 37 stops moving in direction DR3 at a point at which a magnetic force that coil 371 receives from magnets 373 and 374 and a tensile strength of springs 38 and 39 balance.

Magnets 375 and 377 are also of the same polarity and when coil 378 passes current coil 378 receives a magnetic force from magnets 375 and 377 and supporting plate 37 moves in direction DR2 of a track of magneto-optical recording medium 10. Thus, magnetic head 34 can be positionally adjusted in direction DR2.

Figure 9:
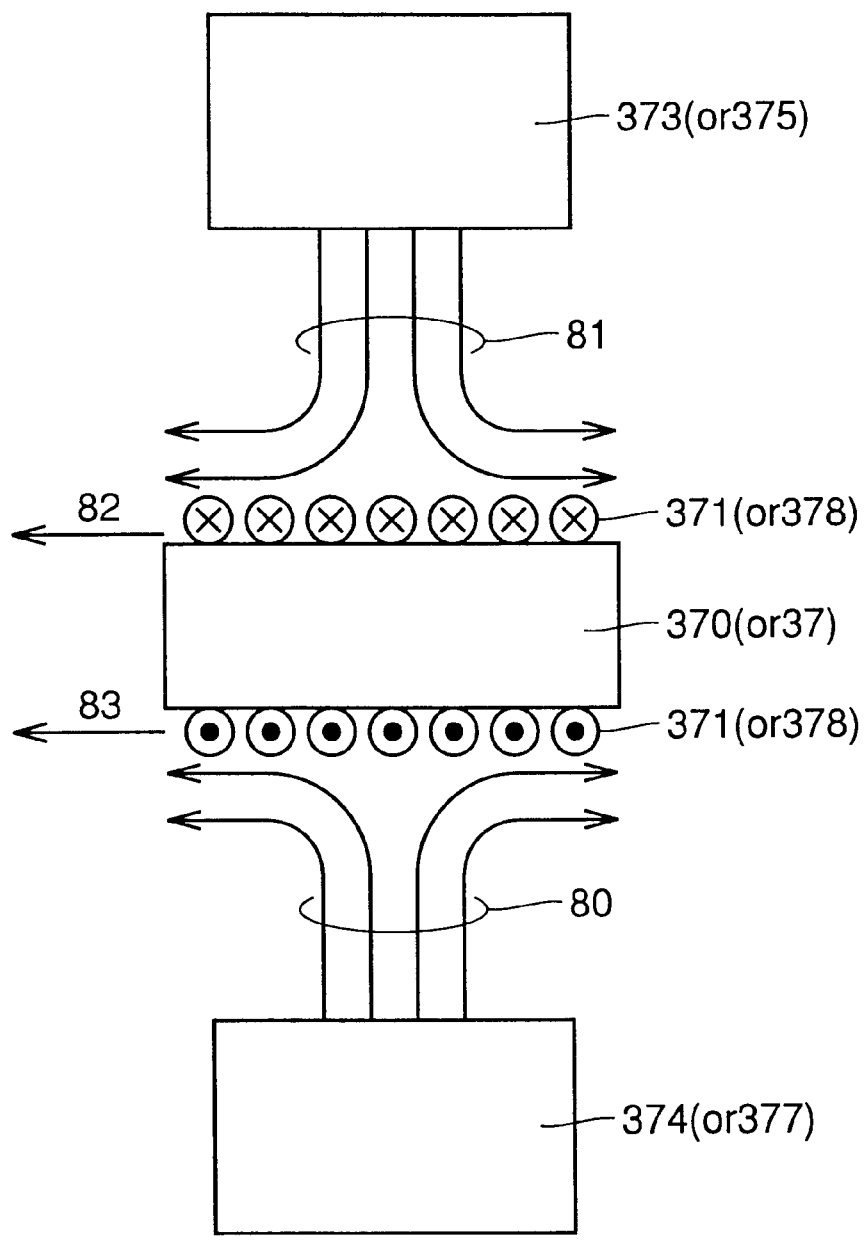
FIG. 9 illustrates a principle of moving the FIG. 8 supporting plate with Lorentz force.

Reference will now be made to FIG. 9 to describe in detail a mechanism allowing coil 371 (or 378) to receive a magnetic force from magnets 373 and 374 (or 375 and 377). Coil 371 (or 378) wound around core 370 (or supporting plate 37) passes current in a certain direction. Herein, core 370 (or supporting plate 37) has an upper portion passing the current in a direction penetrating the plane of the figure backward and a lower portion passing the current in a direction penetrating the plane of the figure frontward. Magnet 373 (or 375) and magnet 374 (or 377) are of the same, negative polarity and magnet 373 (or 375) provides a line of magnetic force 811 and magnet 374 (or 377) provides a line of magnetic force 80. Consequently, core 370 (or supporting plate 37) has an upper coil receiving a magnetic force in the direction of an arrow 82 and a lower coil receiving a magnetic force in the direction of an arrow 83. Thus, coil 371 (or 378) receive magnetic forces of the same direction from magnets 373 and 374 (or 375 and 377) and changing the direction of current flowing through coil 371 (or 378) can change the direction of magnetic force received by coil 371 (or 378).

As such, the FIG. 8 supporting plate 37 can be moved in the direction of a track of magneto-optical recording medium 10 or direction DR2 and the direction of a normal to the recording medium or direction DR3.

Reference will now be made to FIGS. 10A–10C to describe how the first photodetector 117 detects the first magneto-optical signal and the fine clock mark signal. Laser beam LB1 is directed to magneto-optical recording medium 10 and a reflection thereof is detected in an optical head 11 at the first photodetector 117 having six detection regions 1171–1176. Regions A1171 and B1172 and regions C1173 and D1174D are arranged in the direction of a track of the recording medium or direction DR2, and regions A1171 and D1174, regions B1172 and C1173 and regions E1175 and F1176 are arranged in a tracking direction DR1 (or referred to as a "radial direction") of the recording medium.

Regions A1171, B1172, C1173 and D1174 detect laser beam LB1 directed to magneto-optical recording medium 10 and reflected at areas A, B, C and D, respectively. Note that regions E1175 and F1176 detect the first magneto-optical signal received from magneto-optical recording medium 10, as will be described hereinafter.

Magneto-optical recording medium 10 has a land 100 and a groove 101 alternately arranged in tracking direction DR1. Land 100 is provided with a short groove 102 in direction DR2 periodically and groove 101 is provided with a short land 103 in direction DR2 periodically. In the present invention, groove 102 and land 103 will be referred to as a fine clock mark.

Fine clock marks 102 and 103 is detected by the tangential push pull method, and the mark is detected as the sum of an intensity [A] of a laser beam detected at region A1171 and an intensity [D] of a laser beam detected at region D1174 minus theum of an intensity [B] of a laser beam detected at region B1172 and an intensity [C] of a laser beam detected at region C1173. More specifically, fine clock marks 102 and 103 are detected by a component of a circuit 90 or adders 91 and 92 and a subtracter 93. Adder 91 outputs the summation of intensity [A] of the laser beam detected at region A1171 and intensity [D] of the laser beam detected at region D1174, i.e., [A+D], and adder 92 outputs the summation of intensity [B] of the laser beam detected at region B1172 and intensity [C] of the laser beam detected at region C1173, i.e., [B+C]. Subracter 93 subtracts the adder 92 output [B+C] from the adder 91 output [A+D] to output a fine clock marks 102, 103 detection signal FCM=[A+D]−[B+C].

Furthermore, region E1175 detects a laser beam only of an S polarization component provided by Wollaston prism 115, and region F1176 detects a laser beam only of a P polarization component provided by Wollaston prism 115. The laser beams detected at regions E1175 and F1176 have intensities [E] and [F], respectively, which are in turn input to a circuit 97 and a difference thereof is calculated by a subtracter 98 and output from circuit 97 as the first magneto-optical signal RF1=[E]−[F].

The second photodetector 173 has the same detection regions as the first photodetector 117 and detects a reflection of laser beam LB2 to detect the second magneto-optical signal RF2 in the same method as described above.

While in the above description the first photodetector 117 detects fine clock marks 102 and 103, the second photodetector 123 may alternatively detect fine clock marks 102 and 103.

Reference will now be made to FIGS. 11A and 11B to describe how a clock is generated in the FIG. 6 magneto-optical disk apparatus 600 at external synchronization signal generation circuit 114. When laser beam LB1 scans magneto-optical recording medium 10 in direction DR2 of a track of the recording medium, fine clock mark signal FCM is detected by the first photodetector 117, as described with reference to FIGS. 10A–10C. Fine clock mark signal FCM detected is input via the first reproduced-signal amplification circuit 12 to external synchronization signal generation circuit 14, which responds to fine clock mark FCM to generate a fine clock mark detection signal FCMP and generate a clock CK having a fixed number of periodical signals between two adjacent components of fine clock mark detection signal FCMP. Herein, between two adjacent components of signal FCMP there exist 532 periodical signals. As such, magneto-optical disk apparatus 600 uses fine clock marks 102 and 103 of magneto-optical recording medium 10 to generate clock CK to be used for recording and and/or reproducing a signal.

Figure 12:
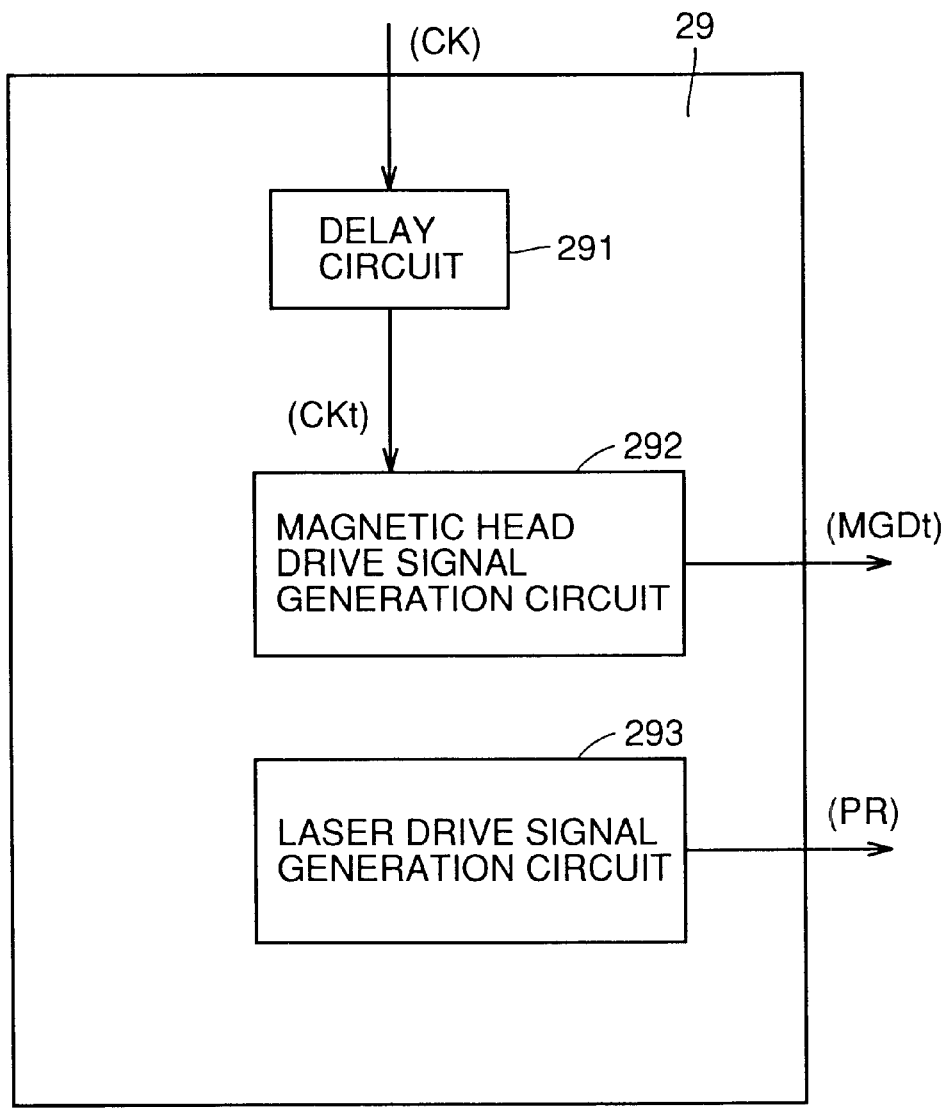
FIG. 12 is a block diagram of a drive signal generation circuit of the FIG. 6 magneto-optical disk apparatus.

With reference to FIG. 12, drive signal generation circuit 29 includes a delay circuit 291, a magnetic head drive signal generation circuit 292 and a laser drive signal generation circuit 293. Delay circuit 291 delays a phase of clock CK by a fixed amount. Magnetic head drive signal generation circuit 292 responds to a clock of delay circuit 291 to generate a drive signal for generating a magnetic field and outputs the drive signal to magnetic head dive circuit 31. Laser drive signal generation circuit 293 generates a drive signal for generating a laser beam of a fixed intensity and outputs the drive signal to laser drive circuit 32.

Figure 13:
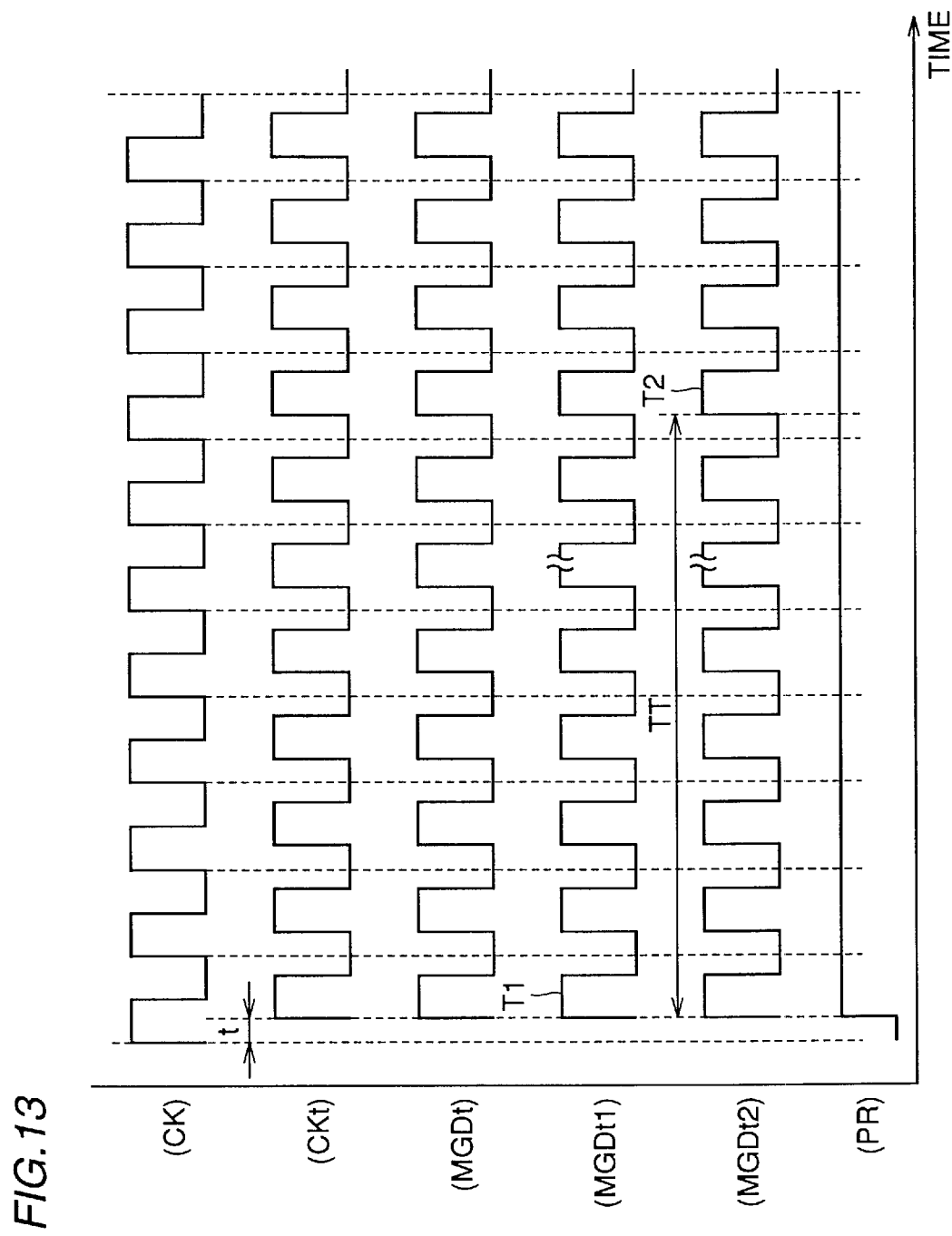
FIG. 13 is timing charts representing a signal in the FIG. 12 drive signal generation circuit.

With reference to FIG. 13, delay circuit 291 receives clock CK from external synchronization signal generation circuit 14, delays a phase of clock CK by a fixed amount t and outputs a delayed clock CKt to magnetic head drive signal generation circuit 292. Magnetic head drive signal generation circuit 292 is synchronized with delayed clock CKt to generate a drive signal MGDt for generating alternating magnetic fields Hex1 and Hex2 and outputs drive signal MGDt to magnetic head drive circuit 31. Laser drive signal generation circuit 293 generates a drive signal PR for generating a laser beam of a fixed intensity and outputs drive signal PR to laser drive circuit 32.

Magnetic head drive circuit 31 responds to drive signal MGDt to drive magnetic head 34, and magnetic head 34 responds to drive signal MGDt to apply alternating magnetic fields Hex1 and Hex2 to magneto-optical recording medium 10. Since magnetic head 34 is configured of a single core 340 and a single coil 341, alternating magnetic fields Hex1 and Hex2 are applied simultaneously to magneto-optical recording medium 10 based on drive signal MGDt. However, as has been described with reference to FIG. 3, alternating magnetic field Hex1 is applied to the recording medium at a point spaced by a length L from a point receiving alternating magnetic field Hex2, and for a single magnetic domain produced in magneto-optical recording medium 10 at recording layer 5, e.g., magnetic domain 55 (FIG. 3), alternating magnetic domain Hex1 is applied in response to a drive signal MGDt1 to magnetic domain 55 at edge 56 and alternating magnetic field Hex2 is applied in response to a drive signal MGDt2 to magnetic domain 55 at an edge opposite to edge 56. More specifically, in response to drive signal MGDt1 at timing T1 alternating magnetic field Hex1 is applied to magnetic domain 55 at edge 56, and after the passage of a period TT thereafter, in response to drive signal MGDt2 at a timing T2 alternating magnetic field Hex2 is applied to magnetic domain 55 at the edge opposite to edge 56. Herein, TT is equal to length L divided by a unit domain length d, i.e., L/d. In the present invention, drive signal MGDt1 will be referred to as "the first drive signal including a first timing at which a first alternating magnetic field is applied including a magnetic field component increasing an in-plane component of a leaking magnetic field created at one edge of any magnetic domain formed in a magneto-optical recording medium" and drive signal MGDt2 will be referred to as "the second drive signal including a second timing at which a second alternating magnetic field is applied containing a magnetic field component increasing an in-plane component of a leaking magnetic field created at the other edge of any magnetic domain formed in the magneto-optical recording medium."

In the present invention, alternating magnetic fields Hex1 and Hex2 are each applied to an edge of a magnetic domain with a leaking magnetic field having a different polarity in an in-plane direction and laser beams LB1 and LB2 are respectively applied to the edges respectively receiving alternating magnetic fields Hex1 and Hex2, to enlarge a magnetic domain to produce a signal. This entails positionally adjusting magnetic head 34 to apply each of alternating magnetic fields Hex1 and Hex2 to an edge as desired, and adjusting a distance between an optical axis of laser beam LB1 and an optical axis of laser beam LB2 to direct each of laser beams LB1 and LB2 to a point as desired.

With reference to FIGS. 6 and 8, magneto-optical recording medium 10 is mounted on magneto-optical disk apparatus 600 and rotated at a predetermined rate by spindle motor 17 and the operation as has been described above is performed to turn on the focus servo and the tracking servo. After external synchronization signal generation signal 14 generates clock CK, controlled by control circuit 26 drive signal generation circuit 29 generates drive signal MGDt for generating alternating magnetic fields Hex1 and Hex2 and drive signal PR for generating a laser beam and outputs drive signals MGDt and PR to magnetic head drive circuit 31 and laser drive circuit 32, respectively. Magnetic head drive circuit 31 responds to drive signal MGDt to drive magnetic head 34 and magnetic head 34 respond to drive signal MGDt to apply alternating magnetic fields Hex1 and Hex2 to magneto-optical recording medium 10. Laser drive circuit 32 responds to drive signal PR to drive semiconductor laser 110 provided in optical head 11 and optical head 11, as has been described above, directs laser beams LB1 and LB2 to magneto-optical recording medium 10 on track Tr. Then, in optical head 11 at the first photodetector 117 the first magneto-optical signal RF1 is detected and at the second photodetector 123 the second magneto-optical signal RF2 is detected. The first magneto-optical signal RF1 detected is transmitted via the first reproduced-signal amplification circuit 12, the first BPF 18 and the first equalizer 19 to composite circuit 23. The second magneto-optical signal RF2 detected is transmitted via the second reproduced-signal amplification circuit 13, the second BPF 20 and the second equalizer 21 to delay circuit 22 and therein the signal has its phase delayed by a fixed amount TT. The second magneto-optical signal having a phase thus delayed, a magneto-optical signal RF2T, is input to composite circuit 23, which composites the first magneto-optical signal RF1 and the second magneto-optical signal RF2T together and outputs the composite signal to demodulation circuit 24. Demodulation circuit 24 demodulates the composite, magneto-optical signal and outputs a reproduced signal to control circuit 26. Control circuit 26 detects an error rate of the received, reproduced signal and if the detected error rate is not a minimal error rate then control circuit 26 controls magnetic head shift circuit 30 to move magnetic head 34 in direction DR2 of a track of magneto-optical recording medium 10 by a fixed amount. As such, magnetic head shift circuit 30 passes current through the FIG. 8 coil 378 in a predetermined direction and magnetic head 34 moves in direction DR2 by a fixed amount. Thereafter, again the first and second magneto-optical signals RF1 and RF2 are detected and control circuit 26 detects a reproduced signal's error rate.

The above process is repeated to positionally adjust magnetic head 34 to allow a reproduced signal to have a minimal error rate.

When magnetic head 34 is positionally adjusted, there is also adjusted a distance between optical axis L01 of laser beam LB1 and optical axis L02 of laser beam LB2. Herein, as in positionally adjusting magnetic head 34, a reproduced signal has its error rate in effect detected and to minimize the detected error rate platform 124 (FIG. 7) having arranged thereon an optical system directing laser beam LB1 to magneto-optical recording medium 10 is moved in direction DR2, as has been described with reference to FIG. 7. Herein, control circuit 26 controls laser beam shift circuit 33 to move platform 124. Thus, laser beam shift circuit 33 drives the motor (not shown) in one direction of arrow 130 as shown in FIG. 7. Thus, platform 124 moves in direction DR2 by a fixed amount.

Thus, laser beam LB1 is positionally adjusted to allow optical axis L01 of laser beam LB1 and optical axis L02 of laser beam LB2 to be spaced by an optimal value L, which is equal to TT multiplied by d.

Figure 14:
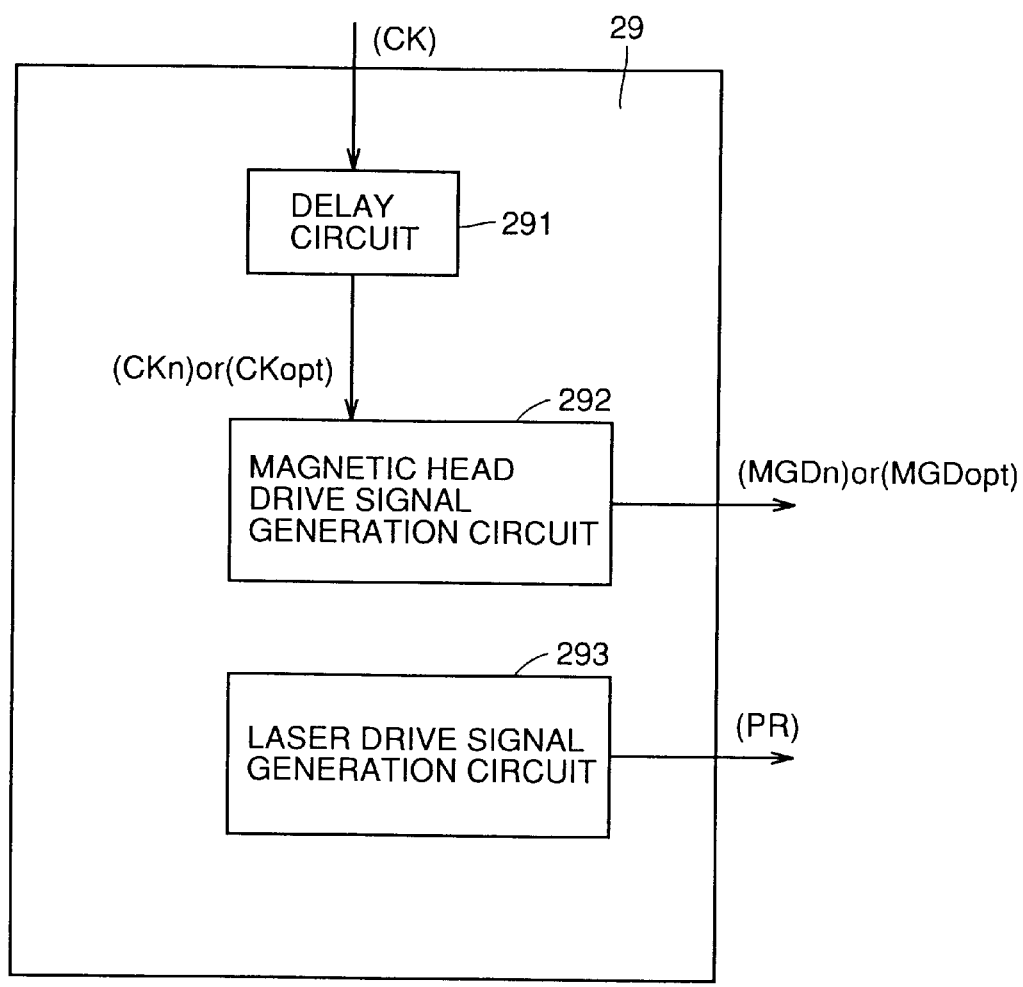
FIG. 14 is a diagram for illustrating an operation of the drive signal generation circuit operating to optimize a phase of a drive signal for generating two alternating magnetic fields.
Figure 15:
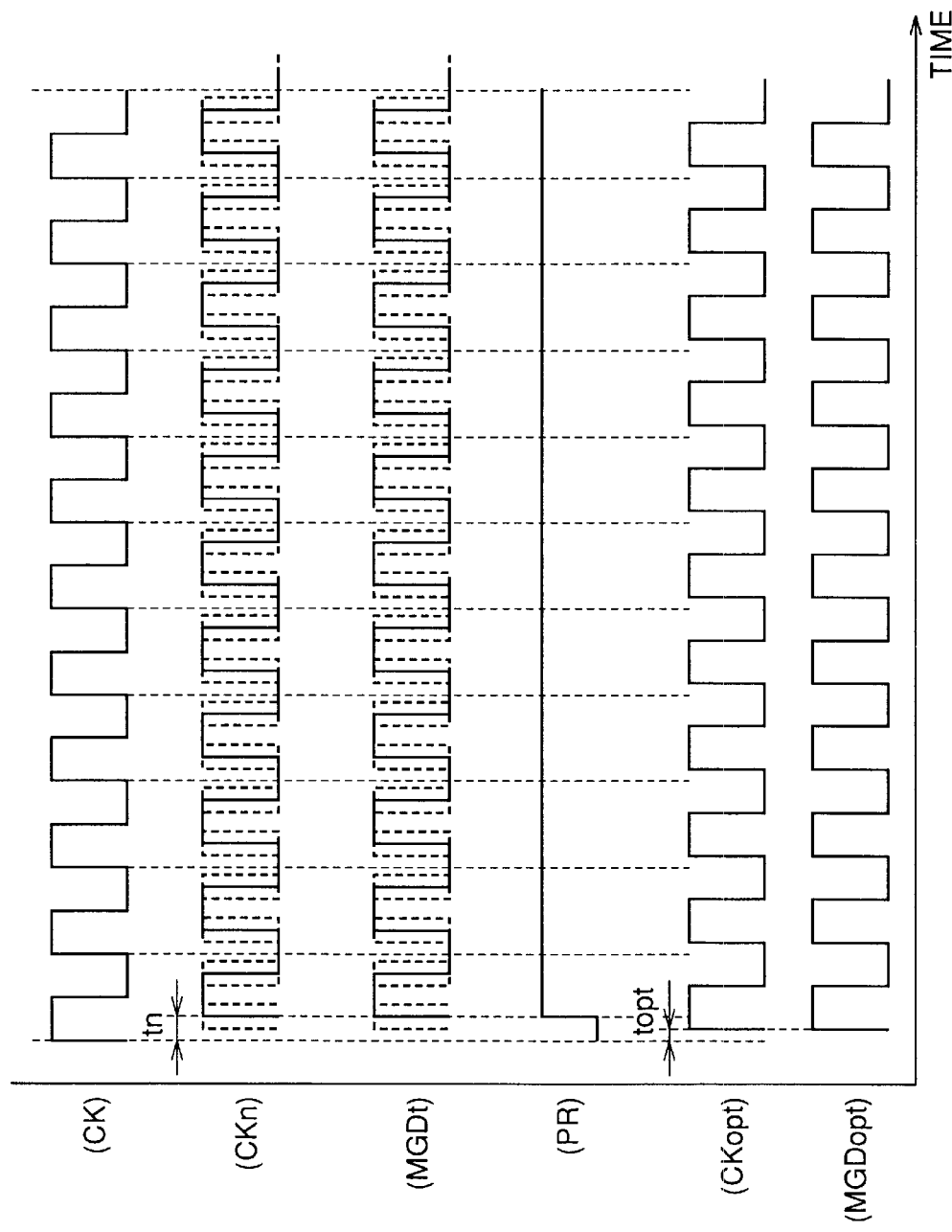
FIG. 15 is timing charts representing a signal in the drive signal generation circuit in optimizing a phase of a drive signal for generating two alternating magnetic fields.

When the magnetic head 34 position and the laser beam LB1 position have been completely adjusted, drive signal MGDt generating alternating magnetic fields Hex1 and Hex2 has its phase adjusted. With reference to FIGS. 14 and 15, to adjust a phase of drive signal MGDt, in drive signal generation circuit 29 delays circuit 291 controlled by control circuit 26 generates n clocks CKn corresponding to clock CK having a phase delayed by tn and outputs the generated n clocks CKn to magnetic head drive signal generation circuit 292, which is synchronized with n clocks CKn to generate n drive signals MGDtn for driving magnetic head 34 and outputs the same to magnetic head drive circuit 31. Laser drive signal generation circuit 293 generates drive signal PR for generating a continues laser beam having a fixed intensity and outputs drive signal PR to laser drive circuit 32. Magnetic head drive circuit 31 responds to n drive signals MGDn to drive magnetic head 34 and magnetic head 34 responds to n drive signals MGDn to apply to magneto-optical recording medium 10 alternating magnetic fields Hex1 and Hex2 timed differently when they are applied to the recording medium. Laser drive circuit 32 responds to drive signal PR to drive semiconductor laser 110 in optical head 11 and optical head 11 directs laser beams LB1 and LB2 to magneto-optical recording medium 10. Then, in the recording medium a magnetic domain is enlarged and therefrom a signal is reproduced, and the reproduced, first and second magneto-optical signals RF1 and RF2 are composited together by composite circuit 23, as has been described previously. The composite, magneto-optical signal is demodulated by demodulation circuit 24 and a reproduced signal is input to control circuit 26, which in turn detects an error rate from the received reproduced signal and from the detected error rate detects a minimal error rate. Then, it detects a phase difference relative to clock CK for providing the minimal error rate and outputs the phase difference to drive signal generation circuit 29 at delay circuit 291. Thus, delay circuit 291 generates an optimal clock (CKopt) having a phase difference relative to clock CK that is received from control circuit 26, and outputs optimal clock CKopt to magnetic head drive signal generation circuit 292, which responds to optimal clock signal CKopt to generate an optimal drive signal MGDopt for output to magnetic head drive circuit 31, which responds to drive signal MGDopt to drive magnetic head 34, which applies alternating magnetic fields Hex1 and Hex2 to magneto-optical recording medium 10. Thus, alternating magnetic fields Hex1 and Hex2 can be applied to each magnetic domain at edges as desired to reproduce a signal accurately.

Figure 16A:
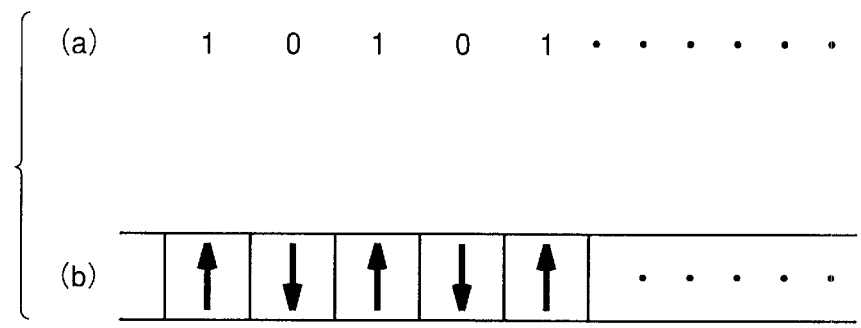
FIG. 16A represents a signal to be recorded and how in a magneto-optical recording medium a recording layer having the signal recorded thereon is magnetized.
Figure 16B:
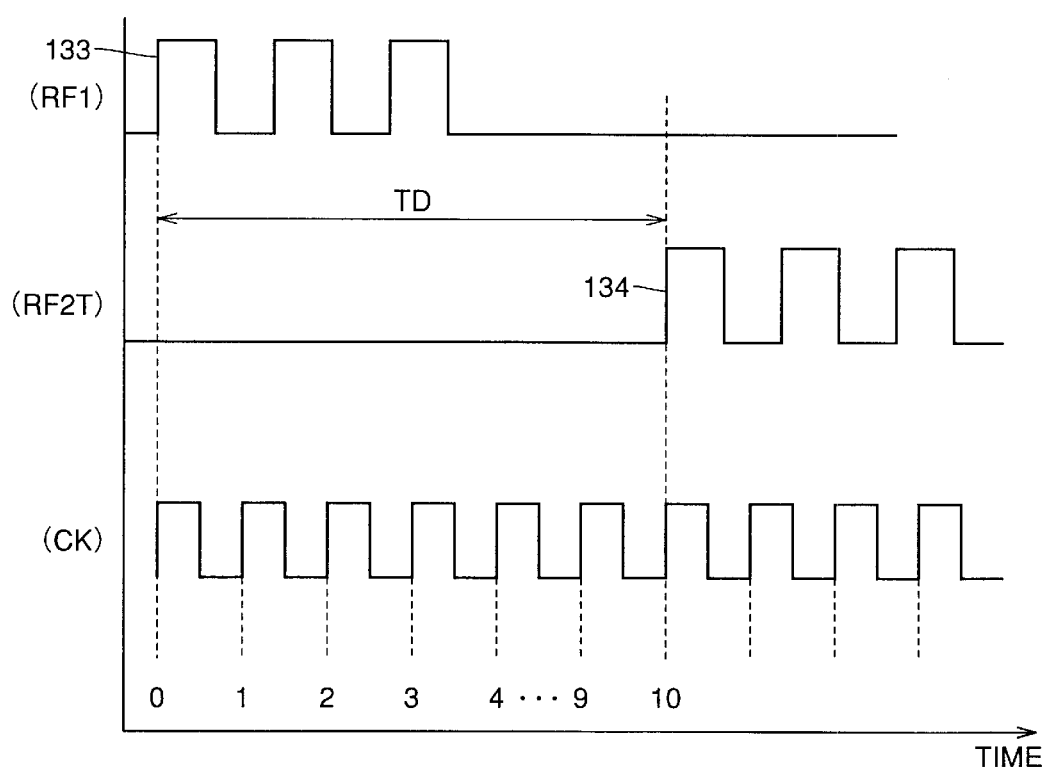
FIG. 16B is timing charts representing a signal in the FIG. 6 magneto-optical recording device at a delay time calibration circuit.
Figure 17:
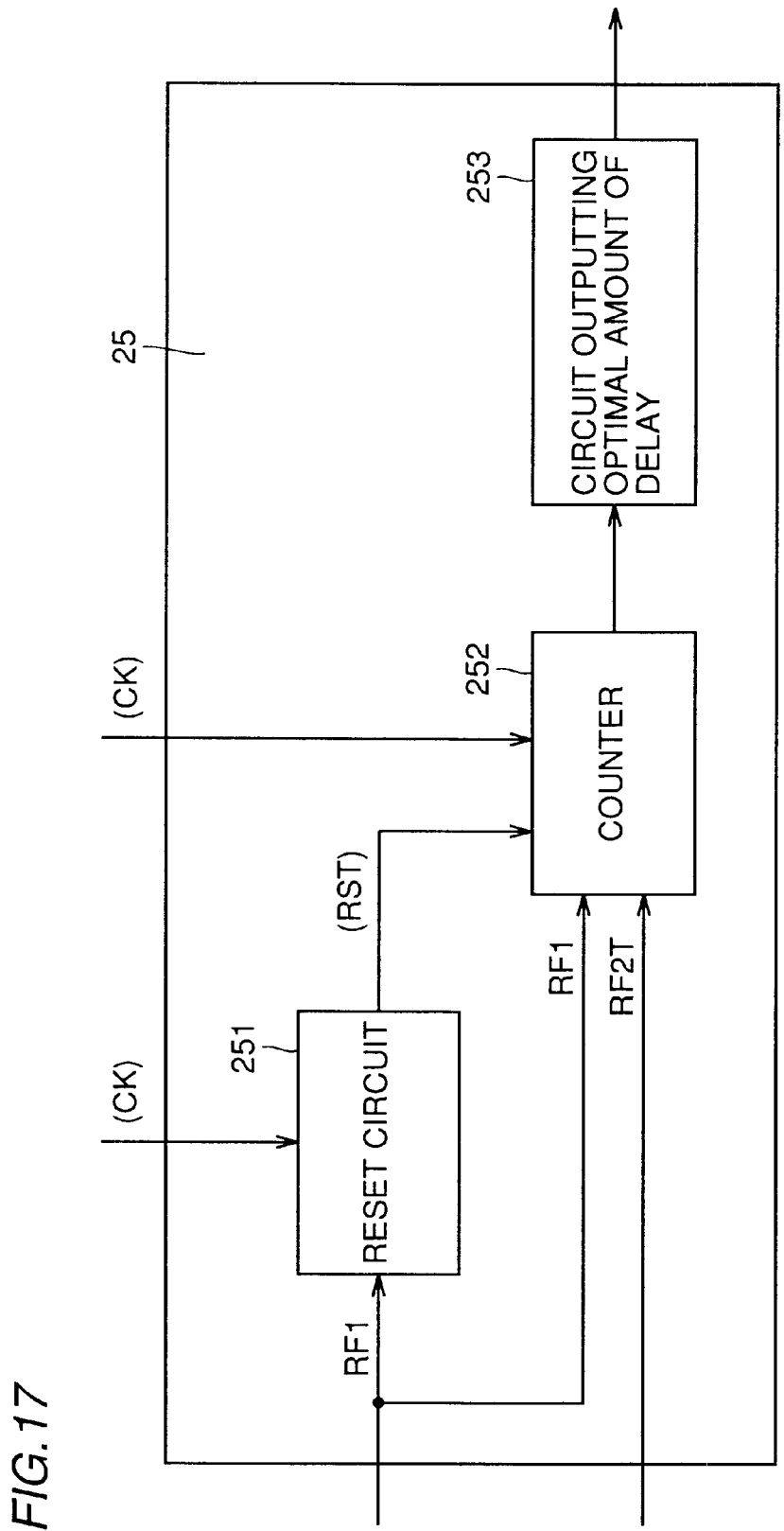
FIG. 17 is a block diagram of the delay time calibration circuit of the FIG. 6 magneto-optical disk apparatus.

After the drive signal for generating alternating magnetic fields Hex1 and HEx2 had its phase optimized, in magneto-optical disk apparatus 600 delay time calibration circuit 25 determines an optimal amount of delay applied to delay a phase of the second magneto-optical signal. Herein, the first equalizer 19 inputs the first magneto-optical signal RF1 to delay time calibration circuit 25 and a second magneto-optical signal RF2T having a phase delayed by a predetermined amount is input from delay circuit 22 to delay time calibration circuit 25. With reference to FIGS. 16A and 16B and 17, in determining an optimal amount of delay, a signal "10101 . . . " provided by unit bits of "1" and "0" alternately arranged is recorded on magneto-optical recording medium 10, as shown in FIG. 16A at (a), and the recording medium has recording layer 5 provided with a magnetic domain having a unit domain length, as shown in FIG. 16B at (b). As shown in FIG. 17, delay time calibration circuit 25 includes a reset circuit 251, a counter 252, and an optimal amount of delay (OAD) output circuit 253. When reset circuit 251 in synchronization with clock CK detects the first magneto-optical signal RF1, reset circuit 251 outputs a reset signal RST to counter 252. At a timing at which reset signal RST is received, counter 252 starts counting clock CK with reference to that component of clock CK synchronized with a first component 133 of the first magneto-optical signal RF1. Counter 252 continues to count clock CK until there is received a first component 134 of the second magneto-optical signal RF2T delayed by delay circuit 22, and counter 252 outputs to OAD output circuit 253 a count value attained at a timing at which component 134 is received.

Essentially, the second magneto-optical signal RF2T is delayed relative to the first magneto-optical signal RF1 by the number of clocks equal to the above mentioned length L divided by unit domain length d, L/d, and the second magneto-optical signal RF2D thus delayed is input to counter 252. As such, counter 252 receives the first and second magneto-optical signals RF1 and RF2T having a phase difference TD that is not large. For example, if a count value of 10 is attained at a timing at which the first component 134 of the second magneto-optical signal RF2T is received, counter 252 outputs a count value "10" to OAD output circuit 253. As such, OAD output circuit 253 outputs to delay circuit 22 an amount of delay corresponding to a phase of the second magneto-optical signal RF2T advanced by nine clocks corresponding to the input count value "10" minus a domain length "1" of a recorded signal. If L/d corresponds to a clock count of 1000, OAD output circuit 253 outputs to delay circuit 22 an amount of delay of 1000−9=991. More specifically, in reproducing a recorded signal having signals "1" and "0" corresponding to the unit domain lengths and alternately arranged, the first and second magneto-optical signals RF1 and RF2T need to be composited such that the signals have therebetween a phase difference set to be a clock count of one. However, if the first magneto-optical signal RF1 as in effect measured and the second magneto-optical signal RF2T has a phase difference of a clock count of 10, that means the second magneto-optical signal RF2T has too delayed a phase. Accordingly, the second magneto-optical signal RF2T has its phase advanced by a clock count of nine to provide a phase difference corresponding to a clock count of one between the first and second magneto-optical signals RF1 and RF2T. Thus, the first and second magneto-optical signals RF1 and RF2T can be composited with an optimal amount of delay to reproduce a signal accurately.

Figure 18:
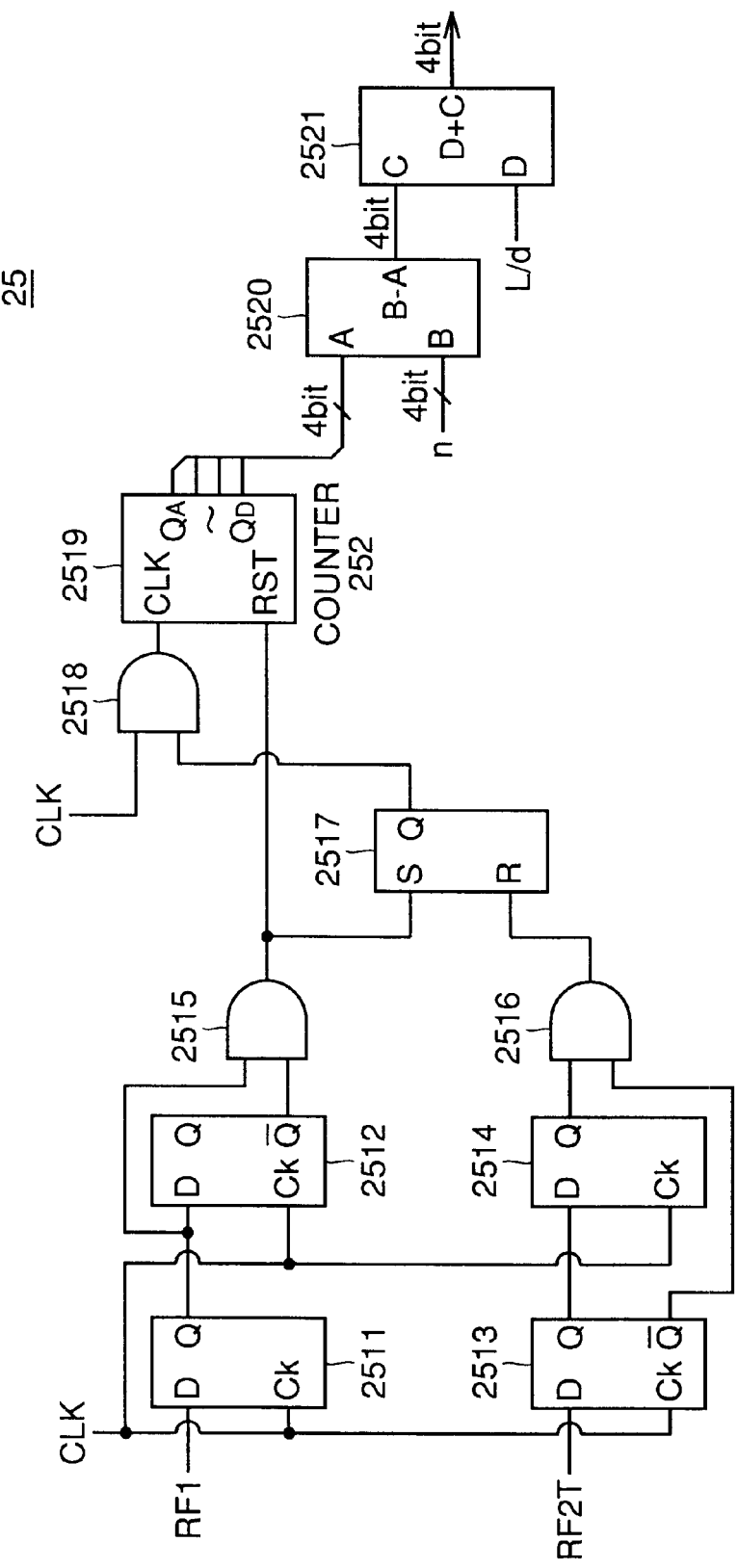
FIG. 18 is a circuit diagram of the delay time calibration circuit of the FIG. 6 magneto-optical disk apparatus.

Delay time calibration circuit 25 is exemplarily shown in the circuit diagram shown in FIG. 18. Delay time calibration circuit 25 includes flip-flops 2511–2514, AND gates 2515, 2516, 2518, an S-R flip-flop 2517, a counter 2519, a differentiator 2520 and an adder 2521. Flip-flop 2511 delays the first magneto-optical signal RF1 by one period of clock CK and flip-flop 2512 delays an output of flip-flop 2511 by one period of clock CK. AND gate 2515 receives an output of flip-flop 2511 and an output of flip-flop 2512 and calculates a logical product of the two signals. More specifically, flip-flops 2511 and 2512 and AND gate 2515 detect a low to high transition in a first component of the first magneto-optical signal RF1.

Flip-flop 2513 delays the second magneto-optical signal RF2T by one period of clock CK and flip-flop 2514 further delays an output of flip-flop 2513 by one period of clock CK. AND gate 2516 receives an inverted version of an output of flip-flop 2513 and an output of flip-flop 2514 and calculates a logical product of the two signals. More specifically, flip-flops 2513 and 2514 and AND gate 2516 detect a high to low transition in a first component of the second magneto-optical signal RF2T. AND gate 2515 outputs a signal which is in turn input to counter 2519 at a reset RST terminal and to S-R flip-flip 2517 at a set terminal. Furthermore, AND gate 2516 outputs a signal which is in turn input to S-R flip-flop 2517 at a reset terminal.

As such, S-R flip-flop 2517 is held set after the reception of a signal detecting the first component of the first magneto-optical signal RF1 and before the reception of a signal detecting the first component of the second magneto-optical signal RF2T and outputs a high level signal to AND gate 2518, and after the reception of the signal detecting the first component of the second magneto-optical signal RF2T S-R flip-flop 2517 is reset and outputs a low level signal to AND gate 2518. While S-R flip-flop 2517 outputs a signal of the high level, i.e., after the first magneto-optical signal RF1 has its first component detected and before the second magneto-optical signal RF2T has its component detected, AND gate 2518 outputs to counter 2519 the same signal as clock CK. After the second magneto-optical signal RF2T has its first component detected, AND gate 2518 outputs a low level signal to counter 2519.

When counter 2519 receives at reset terminal RST a high level signal from AND gate 2515 and is reset, counter 2519 starts counting clock CK received from AND gate 2518. More specifically, when the first magneto-optical signal RF1 has its first component detected, counter 2519 starts counting clock CK. When counter 2519 receives a low level signal from AND gate 2518 or the second magneto-optical signal RF2T has its first component detected, counter 2519 terminates counting clock CK and outputs the current count value in the form of 4-bit data to differentiator 2520 via terminals $Q_A$–$Q_D$. Differentiator 2520 has an A terminal receiving an output of counter 2519 and a B terminal receiving a domain length of a recorded signal for calibration. In the present embodiment, the domain length of a recorded signal for calibration is "1T" and differentiator 2520 thus receives "1" at the B terminal. Furthermore, counter 2519 outputs "10" and differentiator 2520 thus receives "10" at the A terminal. As such, differentiator 2520 output to adder 2521 "1" received at the B terminal minus "10" received at the A terminal, i.e., "–9". Adder 2521 has a D terminal receiving the aforementioned L/d and a C terminal receiving an output of differentiator 2520. Adder 2521 adds together a value received at the C terminal and a value received at the D terminal, for output to delay circuit 22. In the present embodiment, adder 2521 receives 1000 at the D terminal and thus outputs 1000+(–9)=991 to delay circuit 22. Thus, the first and second magneto-optical signals RF1 and RF2T can be composited with an optimal amount of delay to reproduce a signal accurately. After a position of magnetic head 34, a position of laser beam LB1, a phase of a drive signal for generating alternating magnetic fields Hex1 and Hex2, and an amount of delay to be delayed of the second magneto-optical signal RF2 are completely adjusted, magneto-optical disk apparatus 600 enlarges a magnetic domain and reproduces a signal from magneto-optical recording medium 10. Controlled by control circuit 26, drive signal generation circuit 29 generates a drive signal MGDopt for generating alternating magnetic fields Hex1 and Hex2 and drive signal PR for generating a laser beam, and outputs drive signals MGDopt and PR to magnetic head drive circuit 31 and laser drive circuit 32, respectively. Magnetic head drive circuit 31 responds to drive signal MGDopt to drive magnetic head 34, and magnetic head 34 respond to drive signal MGDopt to apply alternating magnetic fields Hex1 and Hex2 to magneto-optical recording medium 10. Furthermore, laser drive circuit 32 respond to drive signal PR to drive semiconductor laser 110 provided in optical head 11, and optical head 11 directs laser beams LB1 and LB2 to magneto-optical recording medium 10 on track Tr, as has been described previously. Then, in optical head 11 the first and second photodetectors 117 and 123 detect the first and second magneto-optical signals RF1 and RF2, respectively. The first magneto-optical signal RF1 detected is transmitted via the first reproduced-signal amplification circuit 12, the first BPF 18 and the first equalizer 19 to composite circuit 23. The second magneto-optical signal RF2 detected is transmitted via the second reproduced-signal amplification circuit 13, the second BPF 20 and the second equalizer 21 to delay circuit 22, which delays a phase by an amount of delay determined by delay time calibration circuit 25. The second magneto-optical signal with a delayed phase (RF2T) is input to composite circuit 23, which composites together the first magneto-optical signal RF1 and the second magneto-optical signal with a delayed phase (RF2T) for output to demodulation circuit 24, which demodulates the composite, magneto-optical signal and outputs it as reproduced data.

If a signal is recorded by magneto-optical disk apparatus 600, data to be recorded is encoded by encoder 27 and modulated by modulation circuit 28 in a predetermined system before it is input to drive signal generation circuit 29. Drive signal generation circuit 29 is synchronized with a clock delayed by a fixed amount relative to a phase of clock signal (CK) to generate a drive signal for generating a magnetic field modulated by a record signal and output the drive signal to magnetic head drive circuit 31, which responds to the received drive signal to drive magnetic head 34, which applies to magneto-optical recording medium 10 the magnetic field modulated by the record signal. Furthermore, drive signal generation circuit 29 generates a drive signal for generating a laser beam having an intensity sufficient to record a signal and outputs the drive signal to laser drive circuit 32, which responds to the received drive signal to drive semiconductor laser 110 provided in optical head 11, which directs laser beam LB1 and LB2 to magneto-optical recording medium 10. In recording a signal, magnetic head 34 has a position adjusted to apply a magnetic field to magneto-optical recording medium 10 vertically. More specifically, magnetic head 34 has a position adjusted to allow either one of laser beams LB1 and LB2 to have an optical axis matching a center of core 340 of magnetic head 34. Thus a signal can be recorded in magneto-optical recording medium 10. Note that magnetic head 34 is moved in direction DR2 of a track of the recording medium, as has been described previously with reference to FIG. 8.

Figure 19:
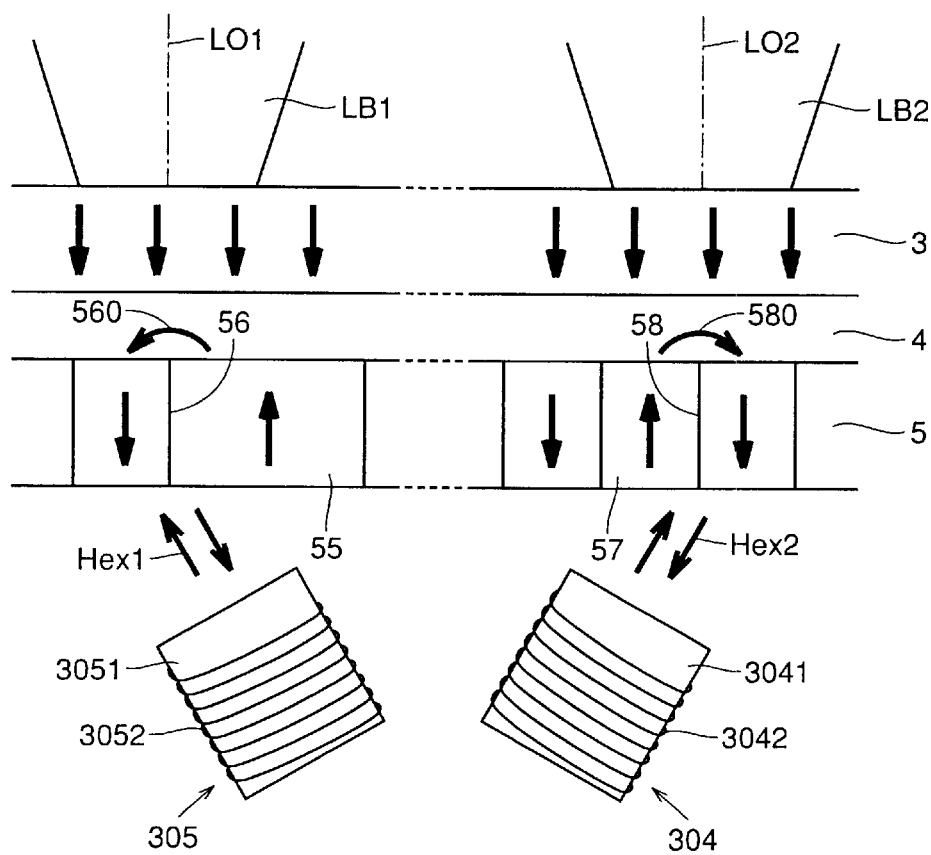
FIG. 19 illustrates another example of the optical head and magnetic head of the FIG. 6 magneto-optical disk apparatus.

In the above description, a magneto-optical disk apparatus employs a single magnetic head and a single optical head to apply alternating magnetic fields Hex1 and Hex2 to magneto-optical recording medium 10 in track direction DR2 at a desired location, direct laser beams LB1 and LB2 and allow any magnetic domain in magneto-optical recording medium 10 to have opposite ends initially transferred and enlarged to enlarge and reproduce the magnetic domain. However, the optical disk device of the present invention is not limited thereto and it may have two magnetic heads and two optical heads. With reference to FIG. 19, a magnetic head 305 applies alternating magnetic field Hex1 to magneto-optical recording medium 10 at edge 56 and a magnetic head 304 applies alternating magnetic field Hex2 to magneto-optical recording medium 10 at edge 58. Magnetic head 304 is configured of a core 3041 and a coil 3042 wound around core 3041, and magnetic head 305 is configured of a core 3051 and a coil 3052 wound around core 3051. An optical head 1101 directs laser beam LB1 to magneto-optical recording medium 10 at edge 56 and an optical head 1102 directs laser beam LB2 to magneto-optical recording medium 10 at edge 58. Thus a magnetic domain can be enlarged and reproduced in the same manner as has been described above.

Figure 20:
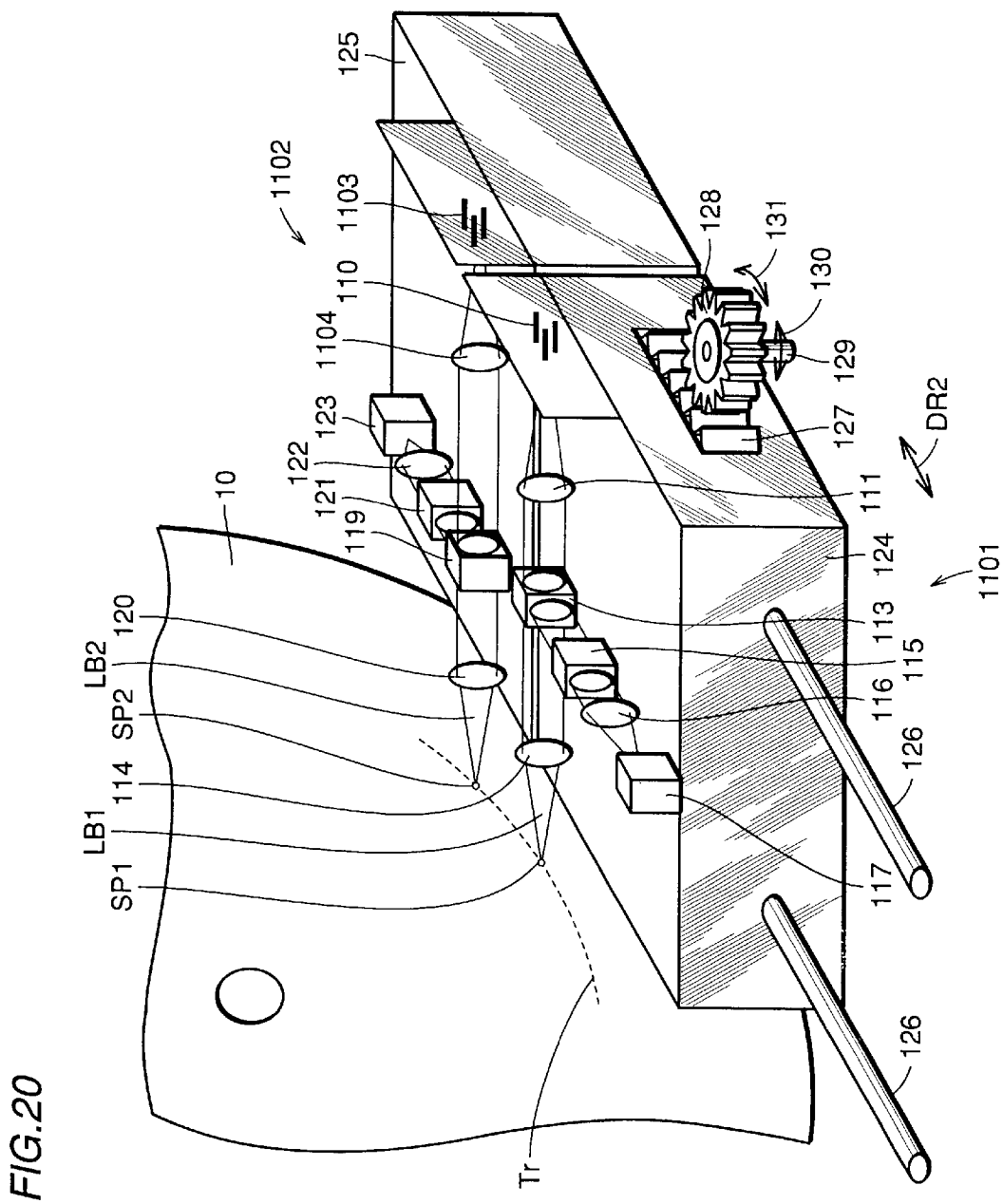
FIG. 20 shows another structure of the optical head of the FIG. 6 magneto-optical disk apparatus.

Reference will now be made to FIG. 20 to describe a configuration of optical heads 1101 and 1102. Optical head 1101 corresponds to the FIG. 7 optical system arranged on platform 124 minus beam splitter 112. As such, a laser beam generated by semiconductor laser 110 is collimated by collimator leans 111 and then incident on half mirror 113. The operation thereafter is as has been described with reference to FIG. 7. Optical head 1102 correspond to the FIG. 7 optical system arranged on platform 125 plus a semiconductor laser 1103 and a collimator lens 1104. As such, a laser beam generated by semiconductor laser 1103 is collimated by a collimator lens 1104 and then incident on half mirror 119. The operation thereafter is as has been described with reference to FIG. 7 and will thus not be described.

Since optical head 1101 is provided on platform 124 movable in direction DR2 of a track of magneto-optical recording medium 10, moving optical head 1101 can adjust a distance between optical axis L01 of laser beam LB1 and optical axis L02 of laser beam LB2 in the same mechanism as has been described previously.

Figure 21:
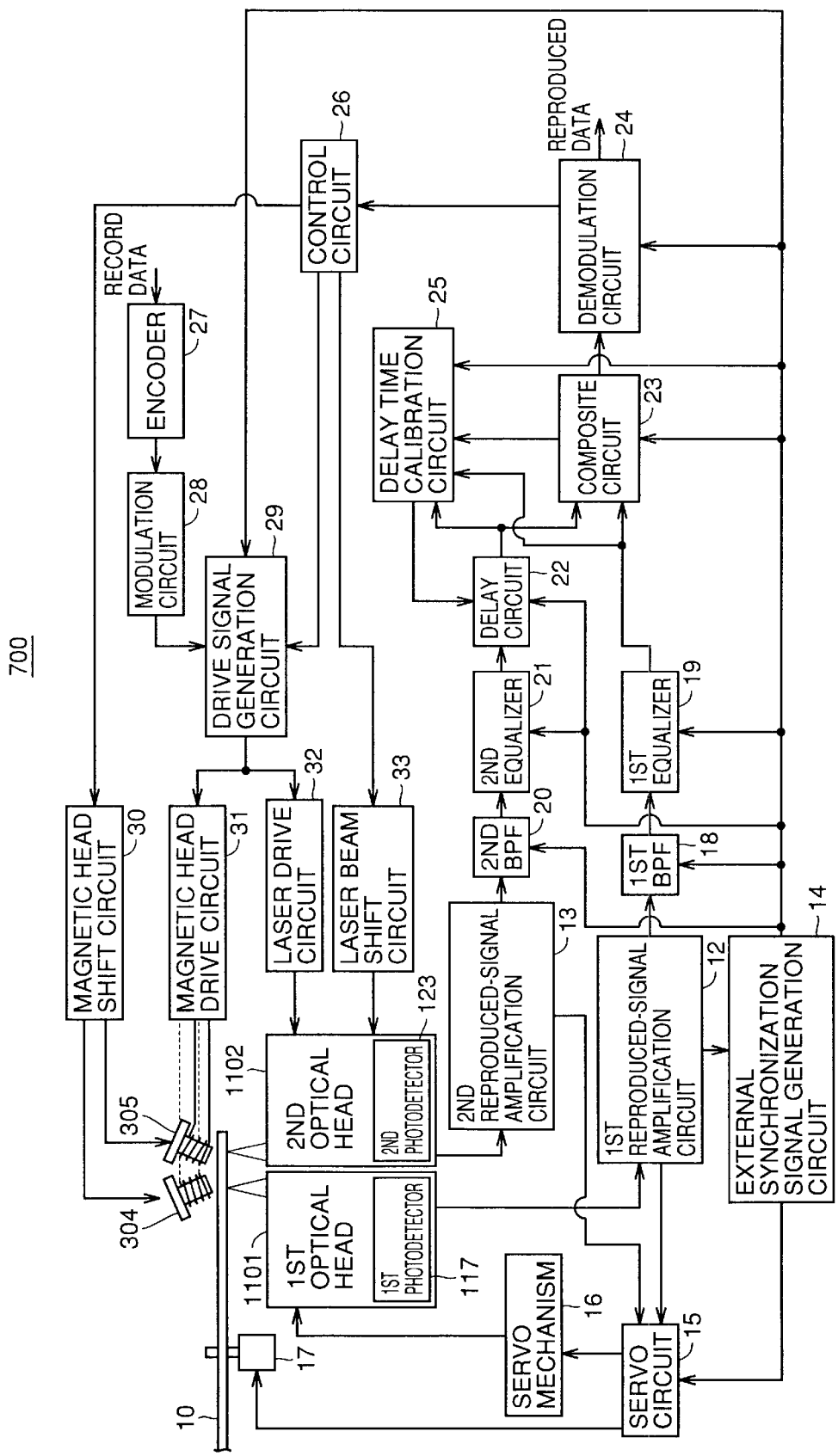
FIG. 21 is another block diagram of the magneto-optical disk apparatus in accordance with the present invention.

FIG. 21 shows a configuration of a magneto-optical disk apparatus 700 having magnetic heads 304 and 305 and optical heads 1101 and 1102. Magnetic head drive circuit 31 drives magnetic heads 304 and 305 independently. Magnetic head shift circuit 30 moves magnetic heads 304 and 305 independently in direction DR2.

Laser drive circuit 32 drives semiconductor laser 110 in optical head 1101 and semiconductor laser 1103 in optical head 1102 independently.

Furthermore, laser beam shift circuit 33 moves optical head 1101 in direction DR2. The remainder is as has been described with reference to FIG. 6. The FIG. 21 magneto-optical disk apparatus 700 can enlarge and reproduce a magnetic domain as accurately as the FIG. 6 magneto-optical disk apparatus 600.

Figure 22:
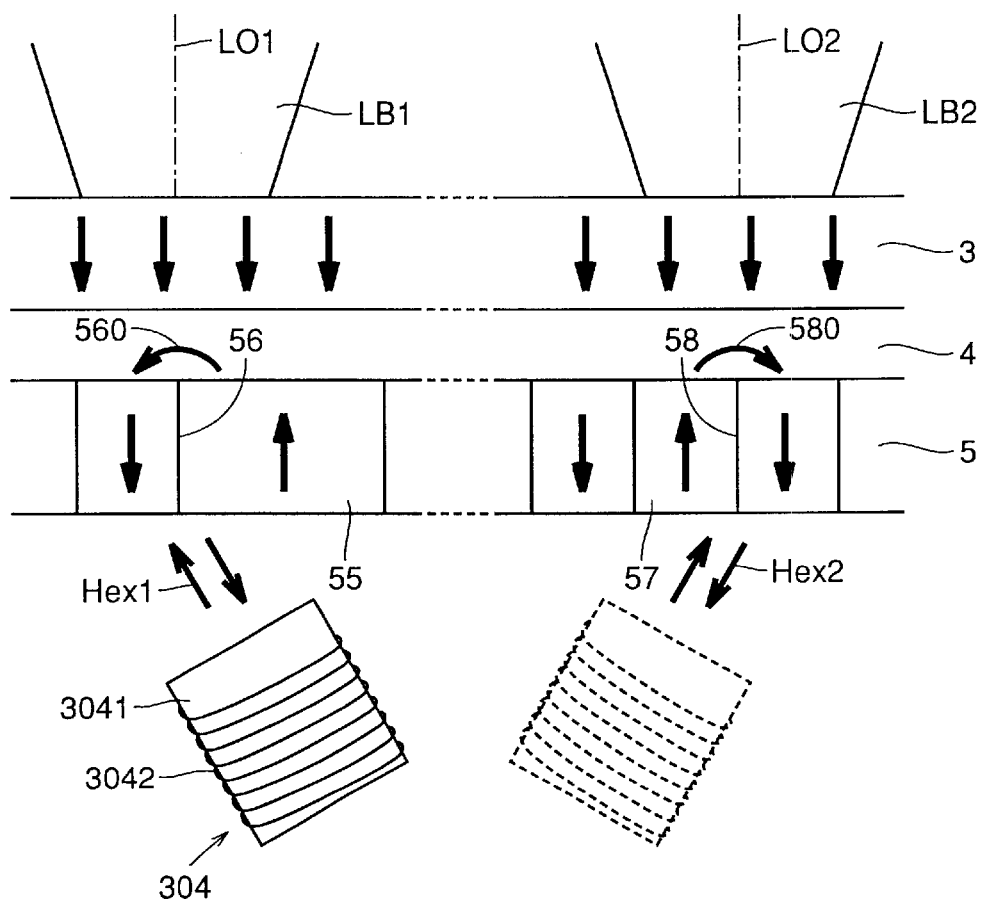
FIG. 22 illustrates still another example of the magnetic head of the FIG. 6 magneto-optical disk apparatus.

Furthermore, in the present invention a magnetic head may be a magnetic head 304, as shown in FIG. 22, rotated in direction DR2 to apply alternating magnetic fields Hex1 and Hex2 to magneto-optical recording medium 10 at edges 56 and 58, respectively. Herein, initially, magnetic head 304 applies alternating magnetic field Hex1 to an edge having a leaking magnetic field having the same polarity as a leaking magnetic field 560, to detect the first magneto-optical signal RF1 from magneto-optical recording medium 10. Then, magnetic head 304 is rotated to apply alternating magnetic field Hex2 to an edge having a leaking magnetic field having the same polarity as a leaking magnetic field 580, to detect the second magneto-optical signal RF2 from magneto-optical recording medium 10.

Furthermore in the present invention any magnetic head other than described above may be used that can apply alternating magnetic fields Hex1 and Hex2.

Furthermore, the present invention includes any magneto-optical disk apparatuses that can apply alternating magnetic fields Hex1 and Hex2 and direct laser beams LB1 and LB2 to detect the first and second magneto-optical signals RF1 and RF2 which are in turn composited together to reproduce a signal.

Figure 23:
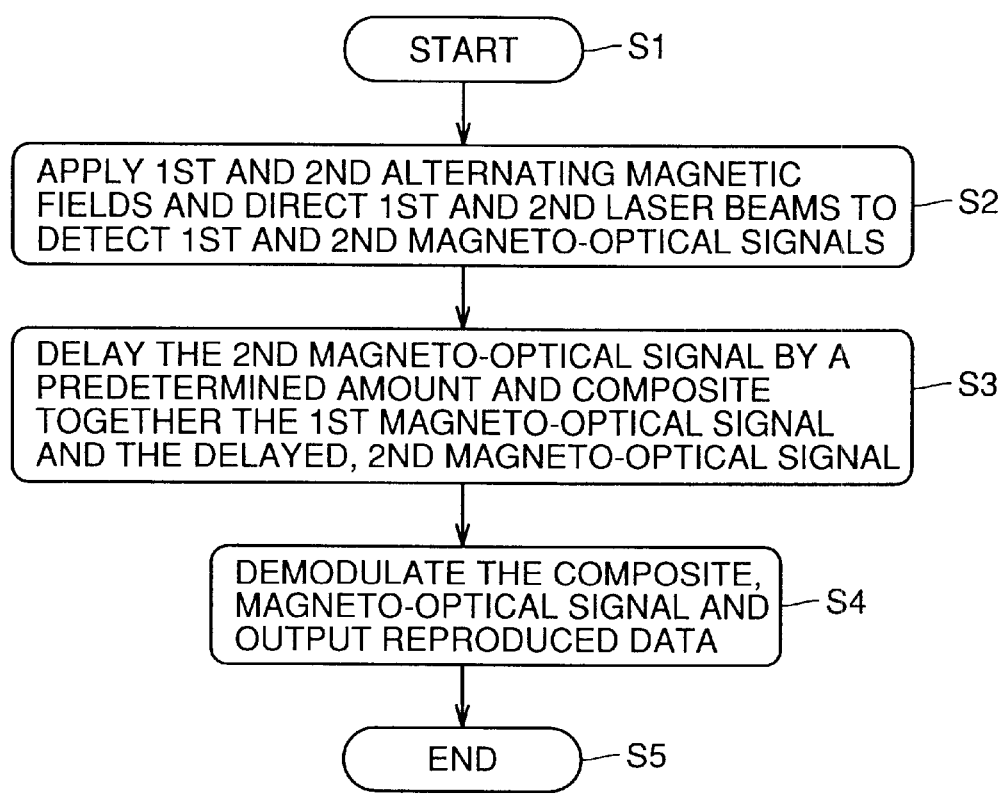
FIG. 23 is a flow chart of a signal reproduction method in accordance with the present invention.

Reference will now be made to FIG. 23 to describe a method of reproducing a signal in accordance with the present invention. At step S1, a signal reproduction operation starts. Then, alternating magnetic fields Hex1 and Hex2 are applied and laser beams LB1 and LB2 are directed to detect the first and second magneto-optical signals RF1 and RF2 (step S2). Then, the second magneto-optical signal RF2 detected has its phase delayed by a predetermined amount and the first magneto-optical signal RF1 and the second magneto-optical signal delayed (RF2T) are composited together (step S3). Then, the composite, magneto-optical signal is demodulated and reproduced data is outputted (step S4). Then, the reproduction process completes (step S5).

Figure 24:
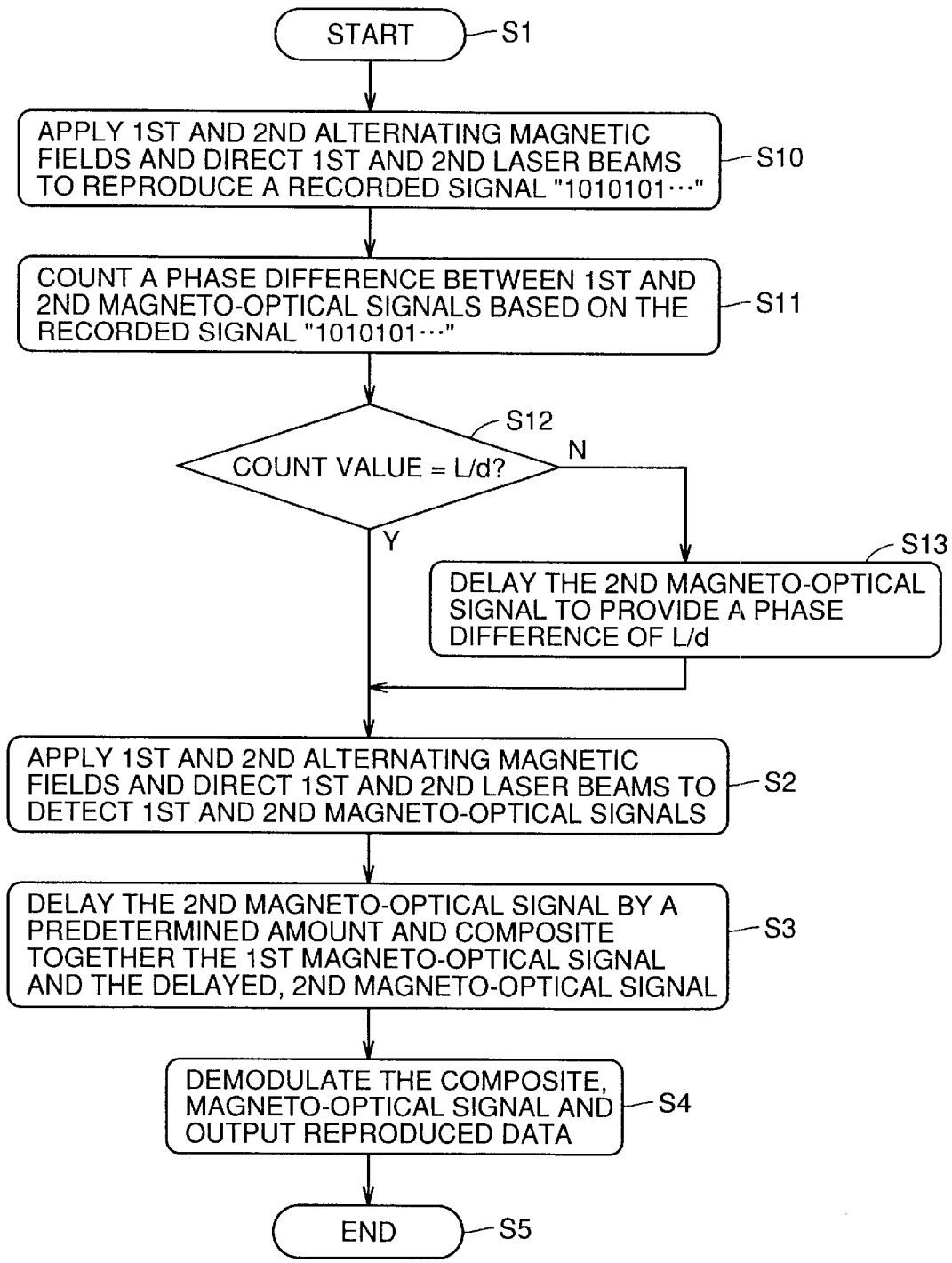
FIG. 24 is another flow chart of a signal reproduction method in accordance with the present invention.

In the present invention, a signal may be reproduced in the process as shown in FIG. 24. The FIG. 24 reproduction process corresponds to the FIG. 23 reproduction process with S10–S13 between S1 and S2. Subsequent to step S1, alternating magnetic fields Hex1 and Hex2 are applied and laser beams LB1 and LB2 are directed to reproduce a signal "10101 . . . " recorded on a magneto-optical recording medium (step S10), and a phase difference between the first and second magneto-optical signals is counted based on the recorded signal "1010101 . . . " (step S11). Control determines whether a count value is optimal phase difference L/d (step S12) and if so then control moves to step S2 and executes the above-described reproduction operation. If not then control delays a phase of the second magneto-optical signal to allow the first and second magneto-optical signals to have therebetween a phase difference corresponding to optimal phase difference L/d (step S13) and then moves to step S2 and provides the above-described reproduction process.

In the FIGS. 23 and 24 reproduction processes a magnetic domain can be enlarged and a signal can be reproduced from a magneto-optical recording medium accurately.

Figure 25:
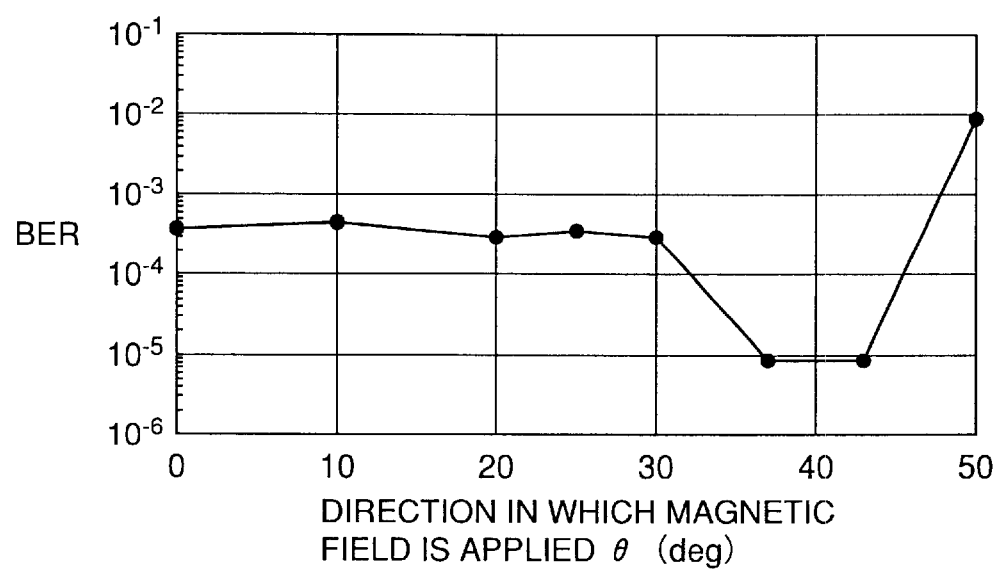
FIG. 25 represents a correlation between an angle of an alternating magnetic field applied to the FIG. 1 magneto-optical recording medium to a normal to the recording medium and an error rate of a reproduced signal.
Figure 26A:
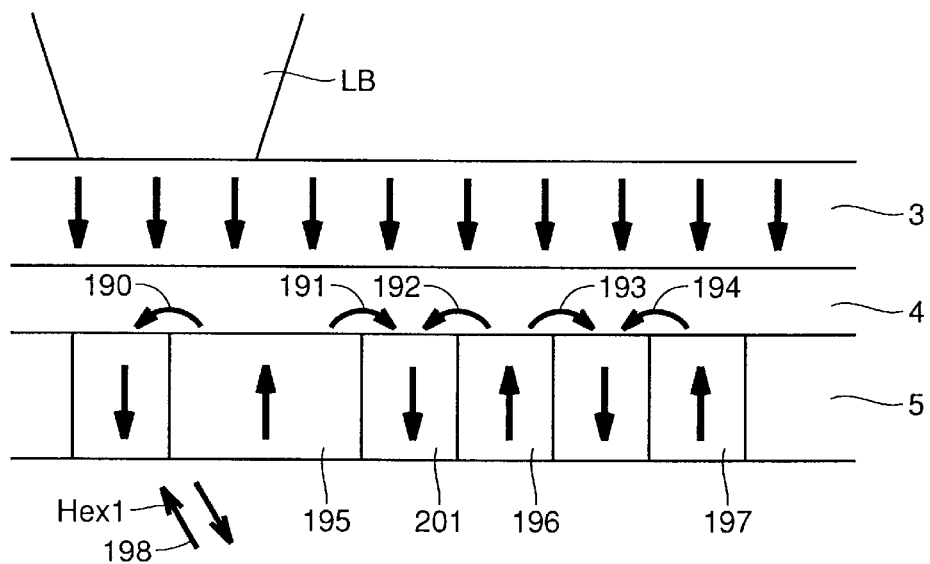
FIG. 26A conceptually shows how in a magneto-optical recording medium a reproducing layer and a recording layer are magnetized.
Figure 26B:
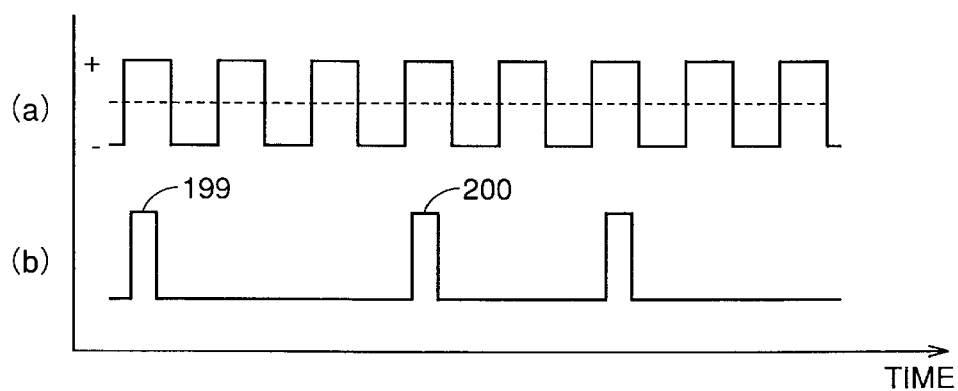
FIG. 26B is timing charts of a timing signal for applying a magnetic field to the FIG. 26A reproducing layer and recording layer, and a reproduced signal detected from the FIG. 26 reproducing layer.
Figure 27A:
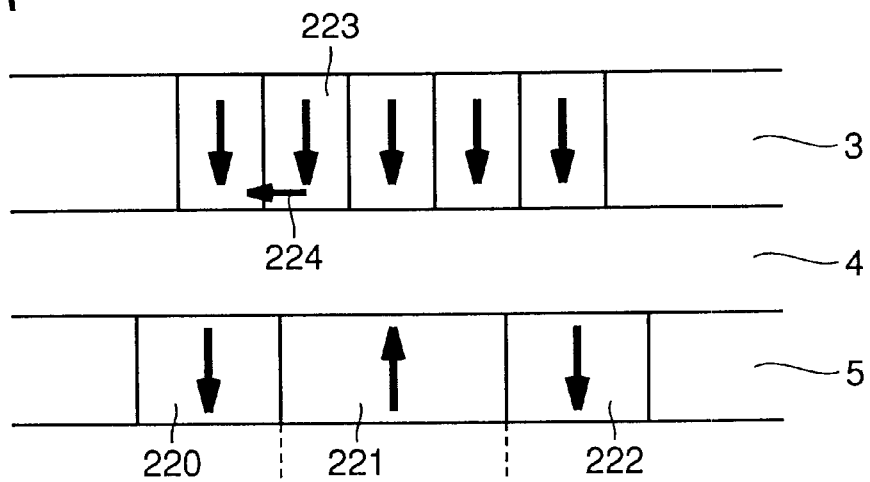
FIG. 27A conceptually shows how in a magneto-optical recording medium a recording layer and a reproducing layer are magnetized.
Figure 27B:
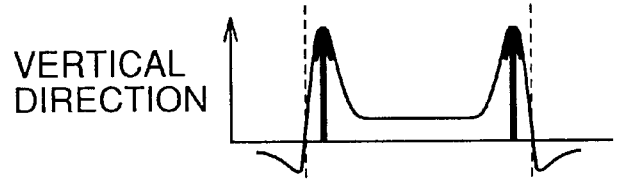
FIG. 27B represents a profile in intensity of magnetic field leaking from a recording layer's magnetic domain in a direction from the recording layer to a reproducing layer.
Figure 27C:
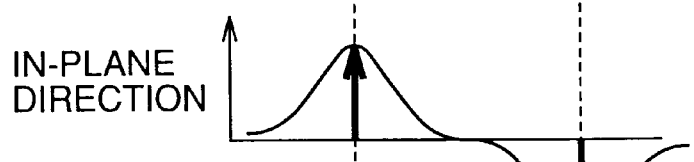
FIG. 27C represents a profile in intensity of a magnetic field leaking from a recording layer as seen in a direction of a plane of a magneto-optical recording medium.
Figure 27D:
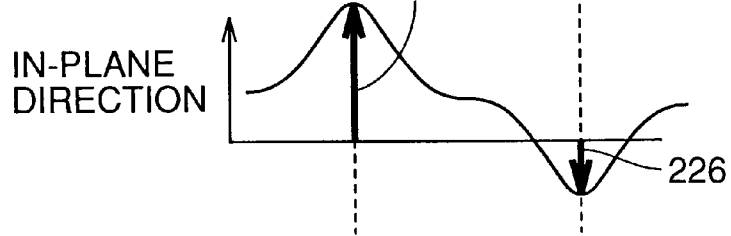
FIG. 27D represents a profile in intensity of a magnetic field leaking from a recording layer as seen in a direction of a plane of a magneto-optical recording medium when an alternating magnetic field is applied thereto.

As has been described above, alternating magnetic fields Hex1 and Hex2 having a predetermined angle to an in-plane direction of magneto-optical recording medium 10 are applied to magneto-optical recording medium 10 to transfer a magnetic domain from recording layer 5 to reproducing layer 3 and enlarge it therein. A reproduced signal has an error rate relative to an angle of an alternating magnetic field applied (an angle relative to a direction of a normal to magneto-optical recording medium 10), as shown in FIG. 25. In FIG. 25, a domain of 0.2 $\mu$m is used as a recorded signal. If alternating magnetic fields Hex1 and Hex2 have an angle of 10° to 30° to a direction of a normal to magneto-optical recording medium 10, a signal is reproduced with an error rate in a range of $3 \times 10^{-4}$ to $5 \times 10^{-4}$. An angle greater than 30° results in a rapidly dropping error rate and an angle in a range from 37° to 43° results in an error rate of $9 \times 10^{-6}$.

In recording a signal in magneto-optical recording medium 10, the (NRZI+) system is employed to modulate the signal. As such, in reproducing a signal recorded in magneto-optical recording medium 10, a reproduced signal detected in a domain enlargement system is demodulated and subjected to error correction. To maintain high recording density and also enhance error correction capability, a signal should be reproduced with an error rate held no more than $10^{-4}$ if the current technology is applied. As such, if a magnetic domain is enlarged to reproduce a signal, an error rate held no more than $10^{-4}$ is only required. Accordingly, as seen in the FIG. 25, an angle of 32° to 46° is only required.

Thus in the present invention, an angle of 32° C. to 46° is set to apply alternating magnetic fields Hex1 and Hex2 to a magnetic domain at an edge thereof to transfer a magnetic domain from a recording layer to a reproducing layer and enlarge it therein to reproduce a signal. Preferably, an angle of 37° to 43° is set to apply alternating magnetic fields Hex1 and Hex2 to a magnetic domain at an edge thereof to transfer the magnetic domain from a recording layer to a reproducing layer and enlarge it therein to reproduce a signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical disk apparatus applying a laser beam and a magnetic field to reproduce a signal from a magneto-optical recording medium having a magnetic domain created therein to record a signal therein, comprising:

a magnetic head applying a first alternating magnetic field to a magnetic domain at one edge existing in a direction of a track of said magneto-optical recording medium, and applying a second alternating magnetic field to said magnetic domain at the other edge existing in said direction of the said track of said magneto-optical recording medium; and an optical head directing a first laser beam to said one edge and a second laser beam to said other edge, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

2. A magneto-optical disk apparatus applying a laser beam and a magnetic field to reproduce a signal from a magneto-optical recording medium having a magnetic domain created therein to record a signal therein, comprising:

a drive signal generation circuit generating a drive signal including a first timing at which a first alternating magnetic field is applied and a second timing at which a second alternating magnetic field is applied;

a magnetic head operating based on said drive signal to apply said first alternating magnetic field to a magnetic domain at one edge existing in a direction of a track of said magneto-optical recording medium, and operating based on said drive signal to apply said second alternating magnetic field to said magnetic domain at the other edge existing in said direction of said track; and an optical head directing a first laser beam to said one edge and a second laser beam to said other edge, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

3. A magneto-optical disk apparatus applying a laser beam and a magnetic field to reproduce a signal from a magneto-optical recording medium having a magnetic domain created therein to record a signal therein, comprising:

a first magnetic head applying a first alternating magnetic field to a magnetic domain at one edge existing in a direction of a track of said magneto-optical recording medium;

a second magnetic head applying a second alternating magnetic field to said magnetic domain at the other edge existing in said direction of said track;

a first optical head directing a first laser beam to said one edge; and a second optical head directing a second laser beam to said other edge, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

4. A magneto-optical disk apparatus applying a laser beam and a magnetic field to reproduce a signal from a magneto-optical recording medium having a magnetic domain created therein to record a signal therein, comprising:

a drive signal generation circuit generating a first drive signal including a first timing at which a first alternating magnetic field is applied, and a second drive signal including a second timing at which a second alternating magnetic field is applied;

a first magnetic head operating based on said first drive signal to apply said first alternating magnetic field to a magnetic domain at one edge existing in a direction of a track of said magneto-optical recording medium;

a second magnetic head operating based on said second drive signal to apply said second alternating magnetic field to said magnetic domain at the other edge existing in said direction of said track;

a first optical head directing a first laser beam to said one edge; and a second optical head directing a second laser beam to said other edge, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

5. A magneto-optical disk apparatus applying a laser beam and a magnetic field to reproduce a signal from a magneto-optical recording medium having a magnetic domain created therein to record a signal therein, comprising:

a magnetic head applying a first alternating magnetic field to a magnetic domain at one edge existing in a direction of a track of said magneto-optical recording medium, and applying a second alternating magnetic field to said magnetic domain at the other edge existing in a direction of a track of said magneto-optical recording medium;

an optical head directing a first laser beam to said one edge and a second laser beam to said other edge; and a composite circuit compositing together a first magneto-optical signal reproduced by applying said first alternating magnetic field and directing said first laser beam and a second magneto-optical signal reproduced by applying said second alternating magnetic field and directing said second laser beam, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

6. A magneto-optical disk apparatus applying a laser beam and a magnetic field to reproduce a signal from a magneto-optical recording medium having a magnetic domain created therein to record a signal therein, comprising:

a drive signal generation circuit generating a drive signal including a first timing at which a first alternating magnetic field is applied and a second timing at which a second alternating magnetic field is applied;

a magnetic head operating based on said drive signal to apply said first alternating magnetic field to a magnetic domain at one edge existing in a direction of a track of said magneto-optical recording medium, and operating based on said drive signal to apply said second alternating magnetic field to said magnetic domain at the other edge existing in said direction of said track;

an optical head directing a first laser beam to said one edge and a second laser beam to said other edge; and a composite circuit compositing together a first magneto-optical signal detected at said first timing and a second magneto-optical signal detected at said second timing, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

7. A magneto-optical disk apparatus applying a laser beam and a magnetic field to reproduce a signal from a magneto-optical recording medium having a magnetic domain created therein to record a signal therein, comprising:

a first magnetic head applying a first alternating magnetic field to a magnetic domain at one edge existing in a direction of a track of said magneto-optical recording medium;

a second magnetic head applying a second alternating magnetic field to said magnetic domain at the other edge existing in said direction of said track;

a first optical head directing a first laser beam to said one edge;

a second optical head directing a second laser beam to said other edge; and a composite circuit compositing together a first magneto-optical signal reproduced by applying said first alternating magnetic field and directing said first laser beam and a second magneto-optical signal reproduced by applying said second alternating magnetic field and directing said second laser beam, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

8. A magneto-optical disk apparatus applying a laser beam and a magnetic field to reproduce a signal from a magneto-optical recording medium having a magnetic domain created therein to record a signal therein, comprising:

a drive signal generation circuit generating a first drive signal including a first timing at which a first alternating magnetic field is applied, and a second drive signal including a second timing at which a second alternating magnetic field is applied;

a first magnetic head operating based on said first drive signal to apply said first alternating magnetic field to a magnetic domain at one edge existing in a direction of a track of said magneto-optical recording medium;

a second magnetic head operating based on said second drive signal to apply said second alternating magnetic field to said magnetic domain at the other edge existing in said direction of said track;

a first optical head directing a first laser beam to said one edge;

a second optical head directing a second laser beam to said other edge; and a composite circuit compositing together a first magneto-optical signal detected at said first timing and a second magneto-optical signal detected at said second timing, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

9. The magneto-optical disk apparatus of claim 5, further comprising a delay time calibration circuit determining an optimal phase difference between a first detection signal obtained by reproducing through said first alternating magnetic field and said first laser beam a recorded signal corresponding to an alternation of a magnetic domain representing a unit bit of 1 and a magnetic domain representing a unit bit of 0 and a second detection signal obtained by reproducing said recorded signal through said second alternating magnetic field and said second laser beam, said optimal phase difference corresponding to a clock count corresponding to a distance between an optical axis of said first laser beam and an optical axis of said second laser beam, wherein said composite circuit composites said first magneto-optical signal and said second magneto-optical signal together based on said optimal phase difference.

10. The magneto-optical disk apparatus of claim 6, further comprising a delay time calibration circuit determining an optimal phase difference between a first detection signal obtained by reproducing through said first alternating magnetic field and said first laser beam a recorded signal corresponding to an alternation of a magnetic domain representing a unit bit of 1 and a magnetic domain representing a unit bit of 0 and a second detection signal obtained by reproducing said recorded signal through said second alternating magnetic field and said second laser beam, said optimal phase difference corresponding to a clock count corresponding to a distance between an optical axis of said first laser beam and an optical axis of said second laser beam, wherein said composite circuit composites said first magneto-optical signal and said second magneto-optical signal together based on said optimal phase difference.

11. The magneto-optical disk apparatus of claim 7, further comprising a delay time calibration circuit determining an optimal phase difference between a first detection signal obtained by reproducing through said first alternating magnetic field and said first laser beam a recorded signal corresponding to an alternation of a magnetic domain representing a unit bit of 1 and a magnetic domain representing a unit bit of 0 and a second detection signal obtained by reproducing said recorded signal through said second alternating magnetic field and said second laser beam, said optimal phase difference corresponding to a clock count corresponding to a distance between an optical axis of said first laser beam and an optical axis of said second laser beam, wherein said composite circuit composites said first magneto-optical signal and said second magneto-optical signal together based on said optimal phase difference.

12. The magneto-optical disk apparatus of claim 8, further comprising a delay time calibration circuit determining an optimal phase difference between a first detection signal obtained by reproducing through said first alternating magnetic field and said first laser beam a recorded signal corresponding to an alternation of a magnetic domain representing a unit bit of 1 and a magnetic domain representing a unit bit of 0 and a second detection signal obtained by reproducing said recorded signal through said second alternating magnetic field and said second laser beam, said optimal phase difference corresponding to a clock count corresponding to a distance between an optical axis of said first laser beam and an optical axis of said second laser beam, wherein said composite circuit composites said first magneto-optical signal and said second magneto-optical signal together based on said optimal phase difference.

13. The magneto-optical disk apparatus of claim 9, wherein when L represents a distance between the optical axis of said first laser beam and the optical axis of said second laser beam and d represents a length of a magnetic domain created in said magneto-optical recording medium and representing a unit bit, as seen in said direction of said track, L/d represents said clock count corresponding to the distance between the optical axis of said first laser beam and the optical axis of said second laser beam.

14. The magneto-optical disk apparatus of claim 10, wherein when L represents a distance between the optical axis of said first laser beam and the optical axis of said second laser beam and d represents a length of a magnetic domain created in said magneto-optical recording medium and representing a unit bit, as seen in said direction of said track, L/d represents said clock count corresponding to the distance between the optical axis of said first laser beam and the optical axis of said second laser beam.

15. The magneto-optical disk apparatus of claim 11, wherein when L represents a distance between the optical axis of said first laser beam and the optical axis of said second laser beam and d represents a length of a magnetic domain created in said magneto-optical recording medium and representing a unit bit, as seen in said direction of said track, L/d represents said clock count corresponding to the distance between the optical axis of said first laser beam and the optical axis of said second laser beam.

16. The magneto-optical disk apparatus of claim 12, wherein when L represents a distance between the optical axis of said first laser beam and the optical axis of said second laser beam and d represents a length of a magnetic domain created in said magneto-optical recording medium and representing a unit bit, as seen in said direction of said track, L/d represents said clock count corresponding to the distance between the optical axis of said first laser beam and the optical axis of said second laser beam.

17. A signal reproduction method applying a laser beam and a magnetic field to reproduce a signal from a magneto-optical recording medium having a magnetic domain created therein to record a signal therein, comprising the steps of:

applying a first alternating magnetic field and directing a first laser beam to a magnetic domain at one edge existing in a direction of a track of said magneto-optical recording medium, and applying a second alternating magnetic field and directing a second laser beam to said magnetic domain at the other edge existing in said direction of said track of said magneto-optical recording medium;

detecting a first magneto-optical signal through said first alternating magnetic field and said first laser beam and a second magneto-optical signal through said second alternating magnetic field and said second laser beam; and compositing said first and second magneto-optical signals together, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

18. A signal reproduction method applying a laser beam and a magnetic field to reproduce a signal from a magneto-optical recording medium having a magnetic domain created therein to record a signal therein, comprising the steps of:

applying a first alternating magnetic field and directing a first laser beam to a magnetic domain at one edge existing in a direction of a track of said magneto-optical recording medium, and applying a second alternating magnetic field and directing a second laser beam to said magnetic domain at the other edge existing in said direction of said track of said magneto-optical recording medium;

determining an optimal phase difference between a first detection signal obtained by reproducing through said first alternating magnetic field and said first laser beam a recorded signal corresponding to an alternation of a magnetic domain representing a unit bit of 1 and a magnetic domain representing a unit bit of 0 and a second detection signal obtained by reproducing said recorded signal through said second alternating magnetic field and said second laser beam, said optimal phase difference corresponding to a clock count corresponding to a distance between an optical axis of said first laser beam and an optical axis of said second laser beam;

detecting a first magneto-optical signal through said first alternating magnetic field and said first laser beam and a second magneto-optical signal through said second alternating magnetic field and said second laser beam; and setting a phase difference between said first and second magneto-optical signals to be said optimal phase difference determined at said second step, and compositing said first and second magneto-optical signals together, wherein said first alternating magnetic field contains a magnetic field component having a predetermined angle to a plane of said direction of said track and increasing an in-plane component of a leaking magnetic field created at said one edge, and said second alternating magnetic field contains a magnetic field component having a predetermined angle to a plane of said direction of said track and increasing an in-plane component of a leaking magnetic field created at said other edge.

19. The signal reproduction method of claim 18, wherein when L represents a distance between the optical axis of said first laser beam and the optical axis of said second laser beam and d represents a length of a magnetic domain created in said magneto-optical recording medium and representing a unit bit, as seen in said direction of said track, L/d represents said clock count corresponding to the distance between the optical axis of said first laser beam and the optical axis of said second laser beam.

* * * * *